(12) United States Patent
Usadi et al.

(10) Patent No.: US 10,087,721 B2
(45) Date of Patent: Oct. 2, 2018

(54) METHODS AND SYSTEMS FOR MACHINE—LEARNING BASED SIMULATION OF FLOW

(75) Inventors: Adam Usadi, Basking Ridge, NJ (US); Dachang Li, Katy, TX (US); Rossen Parashkevov, Houston, TX (US); Sergey A. Terekhov, Troitsk (RU); Xiaohui Wu, Sugar Land, TX (US); Yahan Yang, Pearland, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 806 days.

(21) Appl. No.: 13/805,647

(22) PCT Filed: May 19, 2011

(86) PCT No.: PCT/US2011/037168
§ 371 (c)(1),
(2), (4) Date: Dec. 19, 2012

(87) PCT Pub. No.: WO2012/015515
PCT Pub. Date: Feb. 2, 2012

(65) Prior Publication Data
US 2013/0096898 A1    Apr. 18, 2013

Related U.S. Application Data

(60) Provisional application No. 61/368,921, filed on Jul. 29, 2010.

(51) Int. Cl.
*G06G 7/48* (2006.01)
*E21B 43/00* (2006.01)
(Continued)

(52) U.S. Cl.
CPC .............. *E21B 43/00* (2013.01); *G01V 1/282* (2013.01); *G01V 99/005* (2013.01);
(Continued)

(58) Field of Classification Search
CPC .. G06F 17/5018; G06F 17/5009; G06F 17/16; G06F 2217/16; G01V 2210/66;
(Continued)

(56) References Cited

U.S. PATENT DOCUMENTS

| 5,537,320 A | 7/1996 | Simpson et al. |
| 5,671,136 A | 9/1997 | Willhoit, Jr. |

(Continued)

FOREIGN PATENT DOCUMENTS

| EP | 1653411 | 10/2004 |
| EP | 1707993 | 3/2005 |

(Continued)

OTHER PUBLICATIONS

B.Yeten, et al., "A Comparison Study on Experimental Design and Response Surface Methodologies," SPE Reservoir Symposium, Jan. 2005, 15 pages.*

(Continued)

*Primary Examiner* — Aniss Chad
*Assistant Examiner* — Russ Guill
(74) *Attorney, Agent, or Firm* — ExxonMobil Upstream Research Company—Law Department

(57) ABSTRACT

There is provided a method for modeling a hydrocarbon reservoir that includes generating a reservoir model that has a plurality of sub regions. A solution surrogate is obtained for a sub region by searching a database of existing solution surrogates to obtain an approximate solution surrogate based on a comparison of physical, geometrical, or numerical parameters of the sub region with physical, geometrical, or numerical parameters associated with the existing surrogate solutions in the database. If an approximate solution surrogate does not exist in the database, the sub region is simulated using a training simulation to obtain a set of training parameters comprising state variables and boundary (Continued)

conditions of the sub region. A machine learning algorithm is used to obtain a new solution surrogate based on the set of training parameters. The hydrocarbon reservoir can be simulated using the solution surrogate obtained for the at least one sub region.

10 Claims, 19 Drawing Sheets

(51) Int. Cl.
G01V 1/28 (2006.01)
G06F 17/50 (2006.01)
G06N 99/00 (2010.01)
G01V 99/00 (2009.01)
G06N 3/04 (2006.01)

(52) U.S. Cl.
CPC ....... *G06F 17/5018* (2013.01); *G06N 3/0427* (2013.01); *G06N 99/005* (2013.01); *G01V 2210/66* (2013.01); *G06F 2217/16* (2013.01)

(58) Field of Classification Search
CPC ............. G01V 2210/667; G01V 1/282; G01V 99/005; E21B 2041/0028; E21B 43/00; G06N 3/0454; G06N 3/08; G06N 99/005; G06N 3/0427; G06G 7/57; G01N 15/0826
See application file for complete search history.

(56) References Cited

U.S. PATENT DOCUMENTS

| | | |
|---|---|---|
| 5,706,194 A | 1/1998 | Neff et al. |
| 5,710,726 A | 1/1998 | Rowney et al. |
| 5,747,673 A | 5/1998 | Ungerer et al. |
| 5,764,515 A | 6/1998 | Guerillot et al. |
| 5,835,882 A | 11/1998 | Vienot et al. |
| 5,838,634 A | 11/1998 | Jones et al. |
| 5,844,799 A | 12/1998 | Joseph et al. |
| 5,953,680 A | 9/1999 | Divies et al. |
| 5,992,519 A | 11/1999 | Ramakrishnan et al. |
| 6,018,498 A | 1/2000 | Neff et al. |
| 6,052,529 A | 4/2000 | Watts, III |
| 6,106,561 A | 8/2000 | Farmer |
| 6,128,577 A | 10/2000 | Assa et al. |
| 6,128,579 A | 10/2000 | McCormack et al. |
| 6,138,076 A | 10/2000 | Graf et al. |
| 6,230,101 B1 | 5/2001 | Wallis |
| 6,374,185 B1 | 4/2002 | Taner et al. |
| 6,480,790 B1 | 11/2002 | Calvert et al. |
| 6,549,854 B1 | 4/2003 | Malinverno et al. |
| 6,597,995 B1 | 7/2003 | Cornu et al. |
| 6,662,146 B1 | 12/2003 | Watts |
| 6,664,961 B2 | 12/2003 | Ray et al. |
| 6,823,296 B2 | 11/2004 | Rey-Fabret et al. |
| 6,823,297 B2 | 11/2004 | Jenny et al. |
| 6,826,483 B1 | 11/2004 | Anderson et al. |
| 6,826,520 B1 | 11/2004 | Khan et al. |
| 6,826,521 B1 | 11/2004 | Hess et al. |
| 6,839,632 B2 | 1/2005 | Grace |
| 6,901,391 B2 | 5/2005 | Storm, Jr. et al. |
| 6,940,507 B2 | 9/2005 | Repin et al. |
| 6,980,940 B1 | 12/2005 | Gurpinar et al. |
| 6,987,878 B2 | 1/2006 | Lees et al. |
| 7,043,367 B2 | 5/2006 | Granjeon |
| 7,069,149 B2 | 6/2006 | Goff et al. |
| 7,089,166 B2 | 8/2006 | Malthe-Sorenssen et al. |
| 7,096,122 B2 | 8/2006 | Han |
| 7,096,172 B2 | 8/2006 | Colvin et al. |
| 7,177,787 B2 | 2/2007 | Rey-Fabret et al. |
| 7,191,071 B2 | 3/2007 | Kfoury et al. |
| 7,254,091 B1 | 8/2007 | Gunning et al. |
| 7,277,796 B2 | 10/2007 | Kuchuk et al. |
| 7,280,952 B2 | 10/2007 | Butler et al. |
| 7,286,972 B2 | 10/2007 | Maker |
| 7,363,163 B2 | 4/2008 | Valec-Dupin et al. |
| 7,369,979 B1 | 5/2008 | Spivey |
| 7,369,980 B2 | 5/2008 | Deffenbaugh et al. |
| 7,376,539 B2 | 5/2008 | Lecomte |
| 7,379,853 B2 | 5/2008 | Middya |
| 7,379,854 B2 | 5/2008 | Calvert et al. |
| 7,406,878 B2 | 8/2008 | Rieder et al. |
| 7,412,363 B2 | 8/2008 | Callegari |
| 7,415,401 B2 | 8/2008 | Calvert et al. |
| 7,424,415 B2 | 9/2008 | Vassilev |
| 7,433,786 B2 | 10/2008 | Adams |
| 7,451,066 B2 | 11/2008 | Edwards et al. |
| 7,467,044 B2 | 12/2008 | Tran et al. |
| 7,478,024 B2 | 1/2009 | Gurpinar et al. |
| 7,480,205 B2 | 1/2009 | Wei |
| 7,486,589 B2 | 2/2009 | Lee et al. |
| 7,516,056 B2 | 4/2009 | Wallis et al. |
| 7,523,024 B2 | 4/2009 | Endres et al. |
| 7,526,418 B2 | 4/2009 | Pita et al. |
| 7,539,625 B2 | 5/2009 | Klumpen et al. |
| 7,542,037 B2 | 6/2009 | Fremming |
| 7,546,229 B2 | 6/2009 | Jenny et al. |
| 7,548,840 B2 | 6/2009 | Saaf |
| 7,577,527 B2 | 8/2009 | Velasquez |
| 7,584,081 B2 | 9/2009 | Wen et al. |
| 7,596,056 B2 | 9/2009 | Keskes et al. |
| 7,596,480 B2 | 9/2009 | Fung et al. |
| 7,603,265 B2 | 10/2009 | Mainguy et al. |
| 7,606,691 B2 | 10/2009 | Calvert et al. |
| 7,617,082 B2 | 11/2009 | Childs et al. |
| 7,620,800 B2 | 11/2009 | Huppenthal et al. |
| 7,640,149 B2 | 12/2009 | Rowan et al. |
| 7,657,494 B2 | 2/2010 | Wilkinson et al. |
| 7,672,825 B2 | 3/2010 | Brouwer et al. |
| 7,684,929 B2 | 3/2010 | Prange et al. |
| 7,706,981 B2 | 4/2010 | Wilkinson et al. |
| 7,711,532 B2 | 5/2010 | Dulac et al. |
| 7,716,029 B2 | 5/2010 | Couet et al. |
| 7,771,532 B2 | 5/2010 | Dulac et al. |
| 7,739,089 B2 | 6/2010 | Gurpinar et al. |
| 7,742,875 B2 | 6/2010 | Li et al. |
| 7,752,023 B2 | 7/2010 | Middya |
| 7,756,694 B2 | 7/2010 | Graf et al. |
| 7,783,462 B2 | 8/2010 | Landis, Jr. et al. |
| 7,796,469 B2 | 9/2010 | Keskes et al. |
| 7,809,537 B2 | 10/2010 | Hemanthkumar et al. |
| 7,809,538 B2 | 10/2010 | Thomas |
| 7,822,554 B2 | 10/2010 | Zuo et al. |
| 7,844,430 B2 | 11/2010 | Landis, Jr. et al. |
| 7,860,654 B2 | 12/2010 | Stone |
| 7,869,954 B2 | 1/2011 | Den Boer et al. |
| 7,877,246 B2 | 1/2011 | Moncorge et al. |
| 7,878,268 B2 | 2/2011 | Chapman et al. |
| 7,904,248 B2 | 3/2011 | Li et al. |
| 7,920,970 B2 | 4/2011 | Zuo et al. |
| 7,925,481 B2 | 4/2011 | Van Wagoner et al. |
| 7,932,904 B2 | 4/2011 | Branets et al. |
| 7,933,750 B2 | 4/2011 | Morton et al. |
| 7,953,585 B2 | 5/2011 | Gurpinar et al. |
| 7,970,593 B2 | 6/2011 | Roggero et al. |
| 7,983,883 B2 | 7/2011 | Chen et al. |
| 7,986,319 B2 | 7/2011 | Dommisse |
| 7,991,660 B2 | 8/2011 | Callegari |
| 7,996,154 B2 | 8/2011 | Zuo et al. |
| 8,005,658 B2 | 8/2011 | Tilke et al. |
| 8,050,892 B2 | 11/2011 | Hartman |
| 8,078,437 B2 | 12/2011 | Wu et al. |
| 8,095,345 B2 | 1/2012 | Hoversten |
| 8,095,349 B2 | 1/2012 | Kelkar et al. |
| 8,117,019 B2 | 2/2012 | Sun et al. |
| 8,145,464 B2 | 3/2012 | Arnegaard et al. |
| 8,190,405 B2 | 5/2012 | Appleyard |
| 8,204,726 B2 | 6/2012 | Lee et al. |
| 8,204,727 B2 | 6/2012 | Dean et al. |
| 8,209,202 B2 | 6/2012 | Narayanan et al. |
| 8,212,814 B2 | 7/2012 | Branets et al. |
| 8,249,842 B2 | 8/2012 | Ghorayeb et al. |

(56) References Cited

U.S. PATENT DOCUMENTS

| | | |
|---|---|---|
| 8,255,195 B2 | 8/2012 | Yogeswaren |
| 8,271,248 B2 | 9/2012 | Pomerantz et al. |
| 8,275,589 B2 | 9/2012 | Montaron et al. |
| 8,275,593 B2 | 9/2012 | Zhao |
| 8,280,635 B2 | 10/2012 | Ella et al. |
| 8,280,709 B2 | 10/2012 | Koutsabeloulis et al. |
| 8,285,532 B2 | 10/2012 | Zangl et al. |
| 8,301,426 B2 | 10/2012 | Abasov et al. |
| 8,301,429 B2 | 10/2012 | Hajibeygi et al. |
| 8,315,845 B2 | 11/2012 | Lepage |
| 8,335,677 B2 | 12/2012 | Yeten et al. |
| 8,339,395 B2 | 12/2012 | Williams et al. |
| 8,350,851 B2 | 1/2013 | Flew et al. |
| 8,352,227 B2 | 1/2013 | Klumpen et al. |
| 8,359,184 B2 | 1/2013 | Massonnat |
| 8,359,185 B2 | 1/2013 | Pita et al. |
| 8,370,121 B2 | 2/2013 | Sun et al. |
| 8,374,974 B2 | 2/2013 | Chen et al. |
| 8,386,227 B2 | 2/2013 | Fung et al. |
| 8,401,832 B2 | 3/2013 | Ghorayeb et al. |
| 8,412,501 B2 | 4/2013 | Oury et al. |
| 8,412,502 B2 | 4/2013 | Moncorge et al. |
| 8,423,338 B2 | 4/2013 | Ding et al. |
| 8,428,919 B2 | 4/2013 | Parashkevov |
| 8,429,671 B2 | 4/2013 | Wood et al. |
| 8,433,551 B2 | 4/2013 | Fung et al. |
| 8,437,996 B2 | 5/2013 | Usadi et al. |
| 8,437,999 B2 | 5/2013 | Pita et al. |
| 8,447,525 B2 | 5/2013 | Pepper |
| 8,452,580 B2 | 5/2013 | Strebelle |
| 8,457,940 B2 | 6/2013 | Xi et al. |
| 8,463,586 B2 | 6/2013 | Mezghani et al. |
| 8,484,004 B2 | 7/2013 | Schottle et al. |
| 8,489,375 B2 | 7/2013 | Omeragic et al. |
| 8,494,828 B2 | 7/2013 | Li et al. |
| 8,498,852 B2 | 7/2013 | Xu et al. |
| 8,510,242 B2 | 8/2013 | Al-Fattah |
| 8,515,678 B2 | 8/2013 | Pepper et al. |
| 8,515,720 B2 | 8/2013 | Koutsabeloulis et al. |
| 8,515,721 B2 | 8/2013 | Morton et al. |
| 8,521,496 B2 | 8/2013 | Schottle et al. |
| 8,504,341 B2 | 9/2013 | Cullick et al. |
| 8,532,967 B2 | 9/2013 | Torrens et al. |
| 8,532,969 B2 | 9/2013 | Li et al. |
| 8,543,364 B2 | 9/2013 | Liu et al. |
| 8,577,660 B2 | 11/2013 | Wendt et al. |
| 8,583,411 B2 | 11/2013 | Fung |
| 8,589,135 B2 | 11/2013 | Middya et al. |
| 8,599,643 B2 | 12/2013 | Pepper et al. |
| 8,606,524 B2 | 12/2013 | Soliman et al. |
| 8,612,194 B2 | 12/2013 | Horne et al. |
| 8,630,831 B2 | 1/2014 | Bratvedt et al. |
| 8,635,026 B2 | 1/2014 | Ameen |
| 8,639,444 B2 | 1/2014 | Pepper et al. |
| 8,655,632 B2 | 2/2014 | Moguchaya |
| 8,674,984 B2 | 3/2014 | Ran et al. |
| 8,676,557 B2 | 3/2014 | Ding et al. |
| 8,686,996 B2 | 4/2014 | Cheung et al. |
| 8,688,424 B2 | 4/2014 | Bourbiaux et al. |
| 8,694,261 B1 | 4/2014 | Robinson |
| 8,700,549 B2 | 4/2014 | Hossain et al. |
| 8,712,746 B2 | 4/2014 | Tillier et al. |
| 8,712,747 B2 | 4/2014 | Cullick et al. |
| 8,700,370 B2 | 5/2014 | Landa |
| 8,718,958 B2 | 5/2014 | Breton et al. |
| 8,718,993 B2 * | 5/2014 | Klie ................... 703/10 |
| 8,724,429 B2 | 5/2014 | Houck et al. |
| 8,725,481 B2 | 5/2014 | Usadi et al. |
| 8,731,887 B2 | 5/2014 | Hilliard et al. |
| 8,731,891 B2 | 5/2014 | Sung et al. |
| 8,738,294 B2 | 5/2014 | Ameen |
| 8,762,442 B2 | 6/2014 | Jeong et al. |
| 8,775,141 B2 | 7/2014 | Raphael |
| 8,775,144 B2 | 7/2014 | Han et al. |
| 8,776,895 B2 | 7/2014 | Li et al. |
| 8,780,671 B2 | 7/2014 | Sayers |
| 8,793,111 B2 | 7/2014 | Tilke et al. |
| 8,797,319 B2 | 8/2014 | Lin |
| 8,798,974 B1 | 8/2014 | Nunns |
| 8,798,977 B2 | 8/2014 | Hajibeygi et al. |
| 8,803,878 B2 | 8/2014 | Andersen et al. |
| 8,805,660 B2 | 8/2014 | Güyagüler et al. |
| 8,812,334 B2 | 8/2014 | Givens et al. |
| 8,818,777 B2 | 8/2014 | Howell et al. |
| 8,818,778 B2 | 8/2014 | Salazar-Tio et al. |
| 8,818,780 B2 | 8/2014 | Calvert et al. |
| 8,825,461 B2 | 9/2014 | Sun et al. |
| 8,843,353 B2 | 9/2014 | Posamentier et al. |
| 8,855,986 B2 | 10/2014 | Castellini et al. |
| 8,862,450 B2 | 10/2014 | Derfoul et al. |
| 8,874,804 B2 | 10/2014 | AlShaikh et al. |
| 8,898,017 B2 | 11/2014 | Kragas et al. |
| 8,903,694 B2 | 12/2014 | Wallis et al. |
| 8,935,141 B2 | 1/2015 | Ran et al. |
| 9,058,445 B2 | 6/2015 | Usadi et al. |
| 9,128,212 B2 | 9/2015 | Sun et al. |
| 9,187,984 B2 | 11/2015 | Usadi et al. |
| 9,372,943 B2 | 6/2016 | Li et al. |
| 2002/0049575 A1 | 4/2002 | Jalali et al. |
| 2005/0171700 A1 | 8/2005 | Dean |
| 2006/0122780 A1 | 6/2006 | Cohen et al. |
| 2006/0269139 A1 | 11/2006 | Keskes et al. |
| 2007/0016389 A1 | 1/2007 | Ozgen |
| 2007/0219725 A1 | 9/2007 | Sun et al. |
| 2007/0265815 A1 * | 11/2007 | Couet et al. ................... 703/10 |
| 2007/0277115 A1 | 11/2007 | Glinsky et al. |
| 2007/0279429 A1 | 12/2007 | Ganzer et al. |
| 2008/0126168 A1 | 5/2008 | Carney et al. |
| 2008/0133550 A1 | 6/2008 | Orangi et al. |
| 2008/0144903 A1 | 6/2008 | Wang et al. |
| 2008/0228680 A1 * | 9/2008 | Chen et al. ................... 706/21 |
| 2008/0234988 A1 | 9/2008 | Chen et al. |
| 2008/0255892 A1 * | 10/2008 | Orangi et al. ................... 705/7 |
| 2008/0306803 A1 | 12/2008 | Vaal et al. |
| 2009/0020284 A1 * | 1/2009 | Graf et al. ................ 166/250.15 |
| 2009/0071239 A1 | 3/2009 | Rojas et al. |
| 2009/0122061 A1 | 5/2009 | Hammon, III |
| 2009/0248373 A1 | 10/2009 | Druskin et al. |
| 2009/0281776 A1 | 11/2009 | Chen et al. |
| 2010/0082142 A1 | 4/2010 | Usadi et al. |
| 2010/0132450 A1 | 6/2010 | Pomerantz et al. |
| 2010/0138196 A1 | 6/2010 | Hui et al. |
| 2010/0161300 A1 * | 6/2010 | Yeten et al. ................... 703/10 |
| 2010/0179797 A1 | 7/2010 | Cullick et al. |
| 2010/0185428 A1 | 7/2010 | Vink |
| 2010/0191516 A1 | 7/2010 | Benish et al. |
| 2010/0217574 A1 | 8/2010 | Usadi et al. |
| 2010/0312535 A1 | 12/2010 | Chen et al. |
| 2010/0324873 A1 | 12/2010 | Cameron |
| 2011/0004447 A1 | 1/2011 | Hurley et al. |
| 2011/0015910 A1 | 1/2011 | Ran et al. |
| 2011/0054869 A1 | 3/2011 | Li et al. |
| 2011/0115787 A1 | 5/2011 | Kadlec |
| 2011/0161133 A1 | 6/2011 | Staveley et al. |
| 2011/0232913 A1 | 9/2011 | Sun et al. |
| 2011/0310101 A1 | 12/2011 | Prange et al. |
| 2012/0014217 A1 | 1/2012 | Houck et al. |
| 2012/0059640 A1 | 3/2012 | Roy et al. |
| 2012/0065951 A1 | 3/2012 | Roy et al. |
| 2012/0143577 A1 | 6/2012 | Szyndel et al. |
| 2012/0158389 A1 | 6/2012 | Wu et al. |
| 2012/0159124 A1 | 6/2012 | Hu et al. |
| 2012/0215512 A1 | 8/2012 | Sarma |
| 2012/0215513 A1 | 8/2012 | Branets et al. |
| 2012/0232799 A1 | 9/2012 | Zuo et al. |
| 2012/0232859 A1 | 9/2012 | Pomerantz et al. |
| 2012/0232861 A1 | 9/2012 | Lu et al. |
| 2012/0232865 A1 | 9/2012 | Maucec et al. |
| 2012/0265512 A1 | 10/2012 | Hu et al. |
| 2012/0271609 A1 | 10/2012 | Laake et al. |
| 2012/0296617 A1 | 11/2012 | Zuo et al. |
| 2013/0035913 A1 | 2/2013 | Mishev et al. |
| 2013/0041633 A1 | 2/2013 | Hoteit |
| 2013/0046524 A1 | 2/2013 | Gathogo et al. |

(56) References Cited

U.S. PATENT DOCUMENTS

| | | |
|---|---|---|
| 2013/0073268 A1 | 3/2013 | Abacioglu et al. |
| 2013/0080128 A1 | 3/2013 | Yang et al. |
| 2013/0085730 A1 | 4/2013 | Shaw et al. |
| 2013/0090907 A1 | 4/2013 | Maliassov |
| 2013/0096890 A1 | 4/2013 | Vanderheyden et al. |
| 2013/0096898 A1 | 4/2013 | Usadi et al. |
| 2013/0096899 A1 | 4/2013 | Usadi et al. |
| 2013/0096900 A1 | 4/2013 | Usadi et al. |
| 2013/0110484 A1 | 5/2013 | Hu et al. |
| 2013/0110485 A1 | 5/2013 | Li et al. |
| 2013/0112406 A1 | 5/2013 | Zuo et al. |
| 2013/0116993 A1 | 5/2013 | Maliassov |
| 2013/0118736 A1 | 5/2013 | Usadi et al. |
| 2013/0124097 A1 | 5/2013 | Thorne |
| 2013/0124173 A1 | 5/2013 | Lu et al. |
| 2013/0138412 A1 | 5/2013 | Shi et al. |
| 2013/0151159 A1 | 6/2013 | Pomerantz et al. |
| 2013/0166264 A1 | 6/2013 | Usadi et al. |
| 2013/0185033 A1 | 7/2013 | Tompkins et al. |
| 2013/0204922 A1 | 8/2013 | El-Bakry et al. |
| 2013/0231907 A1 | 9/2013 | Yang et al. |
| 2013/0231910 A1 | 9/2013 | Kumar et al. |
| 2013/0245949 A1 | 9/2013 | Abitrabi et al. |
| 2013/0246030 A1 | 9/2013 | Usadi et al. |
| 2013/0246031 A1 | 9/2013 | Wu et al. |
| 2013/0275106 A1 | 10/2013 | Li et al. |
| 2013/0289961 A1 | 10/2013 | Ray et al. |
| 2013/0304679 A1 | 11/2013 | Fleming et al. |
| 2013/0311151 A1 | 11/2013 | Plessix |
| 2013/0312481 A1 | 11/2013 | Pelletier et al. |
| 2013/0332125 A1 | 12/2013 | Suter et al. |
| 2013/0338985 A1 | 12/2013 | Garcia et al. |
| 2014/0012557 A1 | 1/2014 | Tarman et al. |
| 2014/0166280 A1 | 6/2014 | Stone et al. |
| 2014/0201450 A1 | 7/2014 | Haugen |
| 2014/0214388 A1 | 7/2014 | Gorell |
| 2014/0236558 A1 | 8/2014 | Maliassov |
| 2014/0330547 A1 | 11/2014 | Calvert et al. |
| 2015/0019183 A1 | 1/2015 | Suzuki |
| 2015/0120199 A1 | 4/2015 | Casey |
| 2015/0227655 A1 | 8/2015 | Sun et al. |
| 2015/0293260 A1 | 10/2015 | Ghayour et al. |
| 2016/0035130 A1 | 1/2016 | Branets et al. |
| 2016/0124113 A1 | 5/2016 | Bi et al. |
| 2016/0124117 A1 | 5/2016 | Huang et al. |
| 2016/0125555 A1 | 5/2016 | Branets et al. |

FOREIGN PATENT DOCUMENTS

| | | |
|---|---|---|
| WO | 1999/028767 | 6/1999 |
| WO | 2007/022289 | 2/2007 |
| WO | 2007/116008 | 10/2007 |
| WO | WO 2008/008121 | 1/2008 |
| WO | WO 2008008121 A2 * | 1/2008 |
| WO | WO 2008083004 A2 * | 7/2008 |
| WO | 2009/138290 | 11/2009 |
| WO | 2013/180709 | 12/2013 |
| WO | 2013/184190 | 12/2013 |
| WO | 2013/187915 | 12/2013 |
| WO | 2014/027196 | 2/2014 |
| WO | 2014/051903 | 4/2014 |
| WO | 2014/171947 | 10/2014 |
| WO | 2014/185898 | 11/2014 |
| WO | 2014/185950 | 11/2014 |

OTHER PUBLICATIONS

M. Prevost, "Accurate Coarse Reservoir Modeling Using Unstructured Grids, Flow-Based Upscaling and Streamline Simulation," PhD. Thesis, Stanford University, Petroleum Engineering, Dec. 2003, 247 pages.*

H. Ates, et al., "Dynamic Updating of Reservoir Models," SPE Technical Conference and Exhibition, Oct. 4, 2009, 9 pages.*

T. T Arbogast, "Numerical Subgrid Upscaling of Two-Phase Flow in Porous Media," Proceedings 1999, LNP 552, pp. 35-49, (Eds: Z. Chen, R. E. Ewing, Z.-C. Shi, Springer-Verlag, 2000).*

J. Wu, et al., "Non-Stationary Multiple-Point Geostatistical Simulations With Region Concept" Proceedings of the 20th SCRF Meeting, Stanford, CA, USA. 2007, 53 pages.*

B. Gong, et al., "An Upscaling Procedure for Constructing Generalized Dual-Porosity/Dual-Permeability Models From Discrete Fracture Characterizations," SPE Annual Technical Conference and Exhibition, Society of Petroleum Engineers, Jan. 1, 2006, 14 pages.*

M. Karimi-Fard, et al., "Generation of Coarse—Scale Continuum Flow Models From Detailed Fracture Characterizations," Water resources research, vol. 1, No. 42, Oct. 2006, 13 pages.*

D. Rojas Paico, "A New Proceedure for History Matching Naturally Fractured Reservoirs," Thesis-Engineer Degree, Stanford University, Apr. 2008, 121 Pages.*

Paulo Camargo et al., "Use of neuro-simulation techniques as proxies to reservoir simulator: application in production history matching," 2007, Journal of Petroleum Science, vol. 57, pp. 273-280.*

Marco A. Cardoso, "Machine learning applied to 3-D reservoir simulation," 2007, CiteseerX, pp. 1-11.*

J. Jalali et al., "Reservoir simulation and uncertainty analysis of enhanced CBM production using artificial neural networks," 2009, Society of Petroleum Engineers, SPE 125959, pp. 1-9.*

D.I. Zubarev, "Pros and cons of applying proxy models as a substitute for full reservoir simulations," 2009, Society of Petroleum Engineers, SPE 125959, pp. 1-23.*

Bishop, C.M. (2006), "Pttern Recognition and Machine Learning", Springer, pp. 225-262.

Cullick, A.S. et al. (2006), "Improved and More-Rapid History Matching with a Nonlinear Proxy and Global Optimization", SPE 101933, 2006 SPE Annual Technical Conf. & Exh., 13 pgs.

Ferrari, S. et al. (2005), "Smooth Function Approximation Using Neural Networks", *IEEE Transactions on Neural Networks* 16(1), pp. 24-38.

Johnson, V.M. et al. (2001), "Applying soft computing methods to improve the computational tractability of a subsurface simulation-optimization problem", *J. of Petroleum Science and Eng.* 29, pp. 153-175.

Silva, P.C. et al. (2007), "Use of Neuro-Simulation techniques as proxies to reservoir simulator: Application in production history matching", *J of Petroleum Science and Eng.* 57, pp. 273-280.

Stone, P. (2007), "Introducing Predictive Analytics: Opportunities", SPE 106865, 2007 SPE Digital Energy Conf. & Exh., 7 pgs.

van Zandvoord, W.E.J.J. et al. (2006), "Application of Real Time Surveillance and Optimisation Tools on a Large Asset", SPE 100342, 2006 SPE Asia Pacific Oil & Gas Conf. & Exh., 8 pgs.

U.S. Appl. No. 62/081,159, filed Nov. 18, 2014, Branets, et al.

U.S. Appl. No. 62/073,465, filed Oct. 31, 2014, Bi, et al.

U.S. Appl. No. 62/033,529, filed Aug. 5, 2014, Casey.

U.S. Appl. No. 62/031,097, filed Jul. 30, 2014, Branets, et al.

Aarnes, J. (2004), "Multiscale simulation of flow in heterogeneous oil-reservoirs", SINTEF ICT, Dept. of Applied Mathematics, 2 pgs.

Aarnes, J. et al. (2004), "Toward reservoir simulation on geological grid models", $9^{th}$ European Conf. on the Mathematics of Oil Recovery, 8 pgs.

Ahmadizadeh, M., et al., (2007), "Combined Implicit or Explicit Integration Steps for Hybrid Simulation", *Structural Engineering Research Frontiers*, pp. 1-16.

Bortoli, L. J., et al., (1992), "Constraining Stochastic Images to Seismic Data", Geostatistics, Troia, *Quantitative Geology and Geostatistics* 1, pp. 325-338.

Byer, T.J., et al., (1998), "Preconditioned Newton Methods for Fully Coupled Reservoir and Surface Facility Models", *SPE 49001, 1998 SPE Annual Tech. Conf, and Exh.*, pp. 181-188.

Candes, E. J., et al., (2004), "New Tight Frames of Curvelets and Optimal Representations of Objects with $C^2$ Singularities," *Communications on Pure and Applied Mathematics* 57, pp. 219-266.

Chen, Y. et al. (2003), "A coupled local-global upscaling approach for simulating flow in highly heterogeneous formations", *Advances in Water Resources* 26, pp. 1041-1060.

(56) References Cited

OTHER PUBLICATIONS

Connolly, P., (1999), "Elastic Impedance," *The Leading Edge* 18, pp. 438-452.
Crotti, M.A. (2003), "Upscaling of Relative Permeability Curves for Reservoir Simulation: An Extension to Areal Simulations Based on Realistic Average Water Saturations", SPE 81038, SPE Latin American and Caribbean Petroleum Engineering Conf., 6 pgs.
Donoho, D. L., Hou, X., (2002), "Beamlets and Multiscale Image Analysis," *Multiscale and Multiresolution Methods, Lecture Notes in Computational Science and Engineering* 20, pp. 149-196.
Durlofsky, L.J. (1991), "Numerical Calculation of Equivalent Grid Block Permeability Tensors for Heterogeneous Porous Media", *Water Resources Research* 27(5), pp. 699-708.
Farmer, C.L. (2002), "Upscaling: a review", *Int'l. Journal for Numerical Methods in Fluids* 40, pp. 63-78.
Gai, X., et al., (2005), "A Timestepping Scheme for Coupled Reservoir Flow and Geomechanics in Nonmatching Grids", *SPE 97054, 2005 SPE Annual Tech. Conf and Exh.*, pp. 1-11.
Haas, A., et al., (1994), "Geostatistical Inversion—A Sequential Method of Stochastic Reservoir Modeling Constrained by Seismic Data," *First Break* 12, pp. 561-569.
Haugen, K. B., et al., (2013), "Highly Optimized Phase Equilibrium Calculations", *SPE 163583*, pp. 1-9.
Holden, L. et al. (1992), "A Tensor Estimator for the Homogenization of Absolute Permeability", *Transport in Porous Media* 8, pp. 37-46.
Isaaks, E. H., et al., (1989), "Applied Geostatistics", *Oxford University Press*, New York, pp. 40-65.
Kurzak, J., et al., (2007), "Implementation of Mixed Precision in Solving Systems of Linear Equations on the Cell Processor", *Concurrency Computat.: Pract. Exper.* 2007, vol. 19, pp. 1371-1385.
Journel, A., (1992), "Geostatistics: Roadblocks and Challenges," *Geostatistics, Troia '92: Quanititative Geoglogy and Geostatistics* 1, pp. 213-224.
Klie, H., et al., (2005), "Krylov-Secant Methods for Accelerating the Solution of Fully Implicit Formulations", *SPE 92863, 2005 SPE Reservoir Simulation Symposium*, 9 pgs.
Lie, K.A., et al., (2010), "Discretisation on Complex Grids—Open Source MATLAB Implementation", 12th European Conference on Mathematics of Oil Recovery, pp. 1-21.
Lu, B., et al., (2007), "Iteratively Coupled Reservoir Simulation for Multiphase Flow", *SPE 110114, 2007 SPE Annual Tech. Conf and Exh.*, pp. 1-9.
Mallat, S., (1999), "A Wavelet Tour of Signal Processing", *Academic Press*, San Diego, pp. 80-91.
Mosqueda, G., et al., (2007), "Combined Implicit or Explicit Integration Steps for Hybrid Simulation", *Earthquake Engng. & Struct. Dyn.*, vol. 36(15), pp. 2325-2343 << Exam: Actually Ahmadizadeh-2.
Nybo, R. (2010), "Fault Detection and Other Time Series Opportunities in the Petroleum Industry", Neurocomputing, vol. 73, No. 10-12, pp. 1987-1992.
Strebelle, S., (2002), "Conditional simulations of complex geological structures using multiple-point statistics," *Mathematical Geology* 34(1), pp. 1-21.
Sweldens, W., (1998), "The Lifting Scheme: A Construction of Second Generation Wavelets," *SIAM Journal on Mathematical Analysis* 29, pp. 511-546.
Qi, D. et al. (2001), "An Improved Global Upscaling Approach for Reservoir Simulation", *Petroleum Science and Technology* 19(7 &8), pp. 779-795.
Verly, G., (1991), "Sequential Gaussian Simulation: A Monte Carlo Approach for Generating Models of Porosity and Permeability," Special Publication No. 3 of EAPG—Florence 1991 Conference, Ed.: Spencer, A.M, pp. 345-356.
Whitcombe, D. N., et al., (2002), "Extended elastic impedance for fluid and lithology prediction," *Geophysics* 67, pp. 63-67.
White, C.D. et al. (1987), "Computing Absolute Transmissibility in the Presence of Fine-Scale Heterogeneity", SPE 16011, 9th SPE Symposium in Reservoir Simulation, pp. 209-220.
Wu, X.H. et al. (2007), "Reservoir Modeling with Global Scaleup", SPE 105237, 15th SPE Middle East Oil & Gas Show & Conf., 13 pgs.
Yao, T., et al., (2004), "Spectral Component Geologic Modeling: A New Technology for Integrating Seismic Information at the Correct Scale," Geostatistics Banff, *Quantitative Geology & Geostatistics* 14, pp. 23-33.
Younis, R.M., et al., (2009), "Adaptively-Localized-Continuation-Newton: Reservoir Simulation Nonlinear Solvers That Converge All the Time", *SPE 119147, 2009 SPE Reservoir Simulation Symposium*, pp. 1-21.
Zhang T., et al., (2006), "Filter-based classification of training image patterns for spatial Simulation," *Mathematical Geology* 38, pp. 63-80.
Johnson, V.M., et al., (2001), "Applying Soft Computing Methods to Improve The Computational Tractability of a Subsurface Simulation-Optimization Problem", Journal of Petroleum Science and Engineering, vol. 29, pp. 153-175.
Cullick, A.S., et al., (2006), "Improved and More-Rapid History Matching With a Nonlinear Proxy and Global Optimization", SPE International 101933, pp. 728-740.

\* cited by examiner

300

METHODS AND SYSTEMS FOR MACHINE—LEARNING BASED SIMULATION OF FLOW

CROSS-REFERENCE TO RELATED APPLICATIONS

This application is a National Stage of International Application No. PCT/US11/037168 filed May 19, 2011, which claims the benefit of Provisional Patent Application 61/368,921, filed Jul. 29, 2010 entitled METHODS AND SYSTEMS FOR MACHINE-LEARNING BASED SIMULATION OF FLOW, the entireties of which are incorporated by reference herein.

This application is related to the following U.S. Provisional Patent Applications, the entireties of which are incorporated by reference herein: No. 61/368,923, filed Jul. 29, 2010 entitled METHODS AND SYSTEMS FOR MACHINE-LEARNING BASED SIMULATION OF FLOW; No. 61/368,939, filed Jul. 29, 2010 entitled METHODS AND SYSTEMS FOR MACHINE-LEARNING BASED SIMULATION OF FLOW; and No. 61/368,930, filed Jul. 29, 2010 entitled METHODS AND SYSTEMS FOR MACHINE-LEARNING BASED SIMULATION OF FLOW.

FIELD OF THE INVENTION

Exemplary embodiments of the present techniques relate to a method and system that provides machine-learning techniques to aid in simulations of flow in porous media.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

Hydrocarbons are widely used for fuels and chemical feedstocks. Hydrocarbons are generally found in subsurface rock formations that are generally termed reservoirs. Removing hydrocarbons from the reservoirs depends on numerous physical properties of the rock formations, such as the permeability of the rock containing the hydrocarbons, the ability of the hydrocarbons to flow through the rock formations, and the proportion of hydrocarbons present, among others.

Often, mathematical models termed "reservoir simulation models" are used to simulate hydrocarbon reservoirs for locating hydrocarbons and optimizing the production of the hydrocarbons. A reservoir simulator models the flow of a multiphase fluid through a heterogeneous porous media, using an iterative, time-stepping process where a particular hydrocarbon production strategy is optimized. Most reservoir simulation models assume linear potential flow. Darcy's law may be used to describe the linear relationship between potential gradients and flow velocity. In some regions of the reservoir, non-Darcy flow models such as Forchheimer flow, which describe a non-linear relationship between potential gradient and fluid velocity, may be used. In general, however, these models were developed assuming single-phase flow. Therefore, reservoir simulators have extended those models to multiphase flow assuming that each phase may be handled separately and or coupled via capillary pressure effects.

Once the governing equations are defined, equations on a simulation grid are discretized. State variables are then updated through time according to the boundary conditions. The accuracy of the solution depends on the assumptions inherent in the discretization method and the grid on which it is applied. For example, a simple two-point flux approximation (TPFA) in conjunction with a finite difference approach assumes that the fluid velocity is a function of potentials of only two points. This is valid if the grid is orthogonal and permeability is isotropic in the region in question. If permeability is not isotropic and/or the grid is not orthogonal, this TPFA is incorrect and the fluid velocity will be inaccurate. Alternative multi-point flux approximations (MPFA) or different discretization methods, such as Finite Element Methods, have been applied to address this problem. Such methods currently suffer from their inability to resolve the problem on complex geometries in a computationally efficient manner.

Properties for reservoir simulation models, such as permeability or porosity, are often highly heterogeneous across a reservoir. The variation may be at all length scales from the smallest to the largest scales that can be comparable to the reservoir size. Disregarding the heterogeneity can often lead to inaccurate results. However, computer simulations that use a very fine grid discretization to capture the heterogeneity are computationally very expensive.

Accordingly, the simulation grid is often relatively coarse. As a consequence, each grid cell represents a large volume (e.g. 100 meters to kilometers on each side of a 3D grid cell). However, physical properties such as rock permeability vary quite significantly over that volume. Most modern simulators start with a fine grid representation of the data and use some version of flow-based scale-up to calculate an effective permeability over the coarse grid volume. However, relative permeability, which is a function of saturation, may change dramatically over the volume of the coarse grid when simulated using a fine grid model. This is handled by both scaling up the absolute permeability and assuming that relative permeability scales uniformly in the volume of the coarse grid cell, or by the use of dynamic pseudo functions for each coarse grid cell block. As currently used, pseudo functions do not provide the reusability and flexibility needed to attain their full potential. For example, a change in boundary conditions (moving a well) requires regeneration of the pseudo functions.

In some cases, a dual permeability simulation model may be used to improve scale-up accuracy. Dual permeability simulation models use methods conceptually similar to the use of pseudo functions in order to generate two-level effective permeabilities and matrix-fracture transfer functions. Furthermore, effects such as hysteresis, where relative permeability is not only a function of saturation, but also direction in which saturation is changing, are treated as special cases. In other words, a property such as phase permeability is a scale and time dependent property that is difficult to scale-up accurately and with a simple model.

A method of using a neural network to determine an optimal placement of wells in a reservoir is described in "Applying Soft Computing Methods to Improve the Computational Tractability of a Subsurface Simulation-Optimization Problem," by Virginia M. Johnson & Leah L. Rogers, 29 JOURNAL OF PETROLEUM SCIENCE AND ENGINEERING 2001.153-175 (2001). Using a standard industry reservoir simulator, a knowledge base of 550 simulations sampling different combinations of 25 potential injection locations was created. Neural networks were trained from a representative sample of simulations, which forms a re-useable knowledge base of information for addressing many different management questions. Artificial neural networks (ANNs) were trained to predict peak injection volumes and volumes of produced oil and gas at three and seven years after the commencement of injection. The rapid estimates of these quantities provided by the ANNs were fed into net profit calculations, which in turn were used by a genetic algorithm (GA) to evaluate the effectiveness of different well-field scenarios.

Methods of using different types of neural networks as proxies to a reservoir simulation are described in "Use of Neuro-Simulation techniques as proxies to reservoir simulator: Application in production history matching," by Paulo Camargo Silva, et al., JOURNAL OF PETROLEUM SCIENCE AND ENGINEERING 57 273-280 (2007). In this article, different types of Neural Networks were used as proxies to a reservoir simulator. The Neural Networks were applied in a study of production history matching for a synthetic case and a real case. A reservoir simulator was used to generate training sets for the Neural Networks. And for these cases, the authors were able to reproduce the narrowly modeled behavior response via the ANN.

Methods to provide an improved and faster history matching with a nonlinear proxy are described in "Improved and More-Rapid History Matching with a nonlinear Proxy and Global Optimization," by A. S. Cullick, et al., SPE 101933, SOCIETY OF PETROLEUM ENGINEERS (2008). A comprehensive, nonlinear proxy neural network is trained with a relatively small set of numerical simulations that were defined through a design of experiments (DOE). The neural network is used to characterize parameter sensitivities to reservoir parameters and to generate solution sets of the parameters that match history. The solution sets generated by the neural network can be validated with the simulator or used as initial solutions for a full optimization.

Additional background information can be found in "Smooth Function Approximation Using Neural Networks," by Silvia Ferrari & Robert F. Stengel, IEEE TRANSACTIONS ON NEURAL NETWORKS, Vol. 16, No. 1 (2005); and "Introducing Predictive Analytics: Opportunities," by Paul Stone, SPE 106865, Society of Petroleum Engineers (2007). None of the techniques described above provide a fast and accurate method of using a machine learning techniques to compute a machine learning based solution surrogate for performing a reservoir simulation.

SUMMARY

Exemplary embodiments of the present invention provide techniques for using machine learning to model a hydrocarbon reservoir. An exemplary embodiment provides a method for modeling a hydrocarbon reservoir that includes generating a reservoir model that has a plurality of sub regions. A solution surrogate for at least one sub region is obtained by searching a database of existing solution surrogates to obtain an approximate solution surrogate based on a comparison of physical, geometrical, or numerical parameters of the sub region with physical, geometrical, or numerical parameters associated with the existing surrogate solutions in the database. If an approximate solution surrogate does not exist in the database, the sub region is simulated using a training simulation to obtain a set of training parameters that include state variables and boundary conditions of the sub region. A machine learning algorithm is used to obtain a new solution surrogate based on the set of training parameters, and the new solution surrogate is stored to the database. The method also includes simulating the hydrocarbon reservoir using the solution surrogate obtained for the at least one sub region. The method also includes generating a data representation of a physical hydrocarbon reservoir in a non-transitory, computer-readable, medium based at least in part on the results of the simulation.

In some embodiments, using the machine learning algorithm to obtain a new solution surrogate includes approximating an inverse operator of a matrix equation that provides a solution to the fluid flow through a porous media. The machine learning algorithm may also be used to obtain a plurality of effective phase permeability values for the coarse grid, wherein the plurality of effective phase permeability values is used to calculate fluid flow through a porous media. Using the machine learning algorithm to obtain the new solution surrogate can also include training a neural net using the training parameters, wherein the boundary conditions are used as input to the neural net and the state variables are used as the desired output. Simulating the sub region using the training simulation can include specifying a set of boundary condition types for each boundary of the sub region and generating a fine-gridded computational mesh of the sub region.

In some embodiments, storing the new solution surrogate to the database includes associating the solution surrogate with a set of physical, geometrical, or numerical parameters used to generate the solution surrogate and storing the parameters to the database. The new solution surrogate can be re-used in subsequent hydrocarbon reservoir simulations based on a comparison of the set of physical, geometrical, or numerical parameters stored to the database with the solution surrogate and a new set of physical, geometrical, or numerical parameters that characterize a new sub region. The physical parameters can include distribution of permeability, porosity, grid geometry of the training simulation, or some combination thereof.

An exemplary embodiment provides a method for producing a hydrocarbon from a hydrocarbon reservoir that includes generating a reservoir model having a plurality of sub regions. The method also includes obtaining a solution surrogate for at least on sub region by searching a database of existing solution surrogates to obtain an approximate solution surrogate based on a comparison of physical, geometrical, or numerical parameters of the sub region with physical, geometrical, or numerical parameters associated with the existing surrogate solutions in the database. If an approximate solution surrogate does not exist in the database, the sub region is simulated using a training simulation to obtain a set of training parameters, which can include state variables and boundary conditions of the sub region. A machine learning algorithm can be used to obtain a new solution surrogate based on the set of training parameters, and the new solution surrogate can be stored to the database. The method also includes simulating the hydrocarbon reservoir using the solution surrogate obtained for the at least one sub region and producing a hydrocarbon from the hydrocarbon reservoir based, at least in part, upon the results of the simulation.

In some embodiments, producing the hydrocarbon includes drilling one or more wells to the hydrocarbon reservoir, wherein the wells include production wells, injection wells, or both. Producing the hydrocarbon can also include setting production rates from the hydrocarbon reservoir.

Another exemplary embodiment provides a system for modelling reservoir properties, the system including a processor and a storage medium. The storage medium includes a first solution surrogate that represents a flow response of a first sub region and a first set of physical, geometrical, or numerical parameters corresponding to the first sub region. The storage medium also includes a reservoir model that includes a second sub region and second set of physical, geometrical, or numerical parameters corresponding to the second sub region. The system also includes a non-transitory machine readable medium with code configured to direct the processor to compare the first set of physical, geometrical, or numerical parameters and second set of physical, geometrical, or numerical parameters to determine whether the second sub region can be modelled by the first solution surrogate. If the second sub region cannot be modelled by the first solution surrogate, the processor is also directed to simulate the second sub region using a training simulation to obtain a set of training parameters comprising state variables and boundary conditions of the second sub region. A machine learning algorithm is used to obtain a second solution surrogate based on the set of training parameters, and the second solution surrogate is stored to the storage medium.

In some embodiments, the machine readable medium includes code configured to direct the processor to obtain the second solution surrogate by approximating an inverse operator of a matrix equation that provides a solution to the fluid flow through a porous media. In some embodiments, the system includes a neural net, wherein the machine readable medium includes code configured to direct the processor to train the neural net using the training parameters.

In some embodiments, the machine readable medium includes code configured to direct the processor to specify a set of boundary condition types for each boundary of the sub region and generate a fine-gridded computational mesh of the sub region based, at least in part, on the second set of physical, geometrical, or numerical parameters. The first set of physical, geometrical, or numerical parameters and the second set of physical, geometrical, or numerical parameters can include a permeability distribution of the sub region, a grid geometry of the sub region, or a combination thereof. In some embodiments, the machine readable medium includes code configured to direct the processor to perform a reservoir simulation of the reservoir model, wherein the first solution surrogate is used to determine a flux at a boundary of the second sub region.

Another exemplary embodiment provides a non-transitory, computer readable medium that includes code configured to direct a processor to create a simulation model of a hydrocarbon reservoir, wherein the simulation model includes a plurality of sub regions. The computer readable medium also includes code configured to direct the processor to search a database of solution surrogates to identify a solution surrogate for each of the plurality of sub regions. The computer readable medium also includes code configured to direct the processor to compute a new solution surrogate for each sub region that does not correspond with a solution surrogate from the database, wherein computing the new solution surrogate includes simulating the sub region using a training simulation to obtain a set of training parameters comprising state variables and boundary conditions of the sub region, and using a machine learning algorithm to obtain a new solution surrogate based on the set of training parameters. The computer readable medium also includes code configured to direct the processor to store the new solution surrogate to the database.

In some embodiments, computer readable medium includes code configured to direct the processor to compute the new solution surrogate by approximating an inverse operator of a matrix equation that provides a solution to the fluid flow through a porous media. The computer readable medium can also include code configured to direct the processor to generate a neural net and train the neural net using the training parameters. The computer readable medium can also include code configured to direct the processor to determine a set of boundary condition types for each boundary of the sub region, and generate a fine-gridded computational mesh of the sub region for use in the training simulation of the sub region. The computer readable medium can also include code configured to direct the processor to perform a simulation of the hydrocarbon reservoir, wherein a flow response of each of the plurality of sub regions is computed using the corresponding solution surrogate obtained for each sub region.

BRIEF DESCRIPTION OF THE DRAWINGS

The advantages of the present techniques are better understood by referring to the following detailed description and the attached drawings, in which.

DETAILED DESCRIPTION

Figure 1:
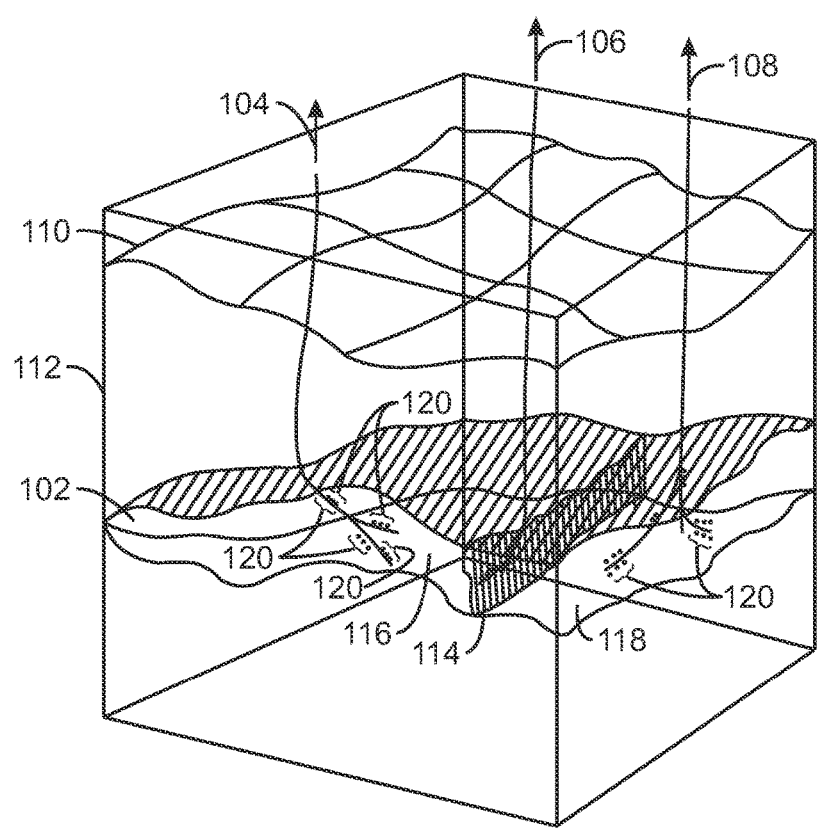
FIG. 1 is a schematic view of a reservoir, in accordance with an exemplary embodiment of the present techniques.

In the following detailed description section, the specific embodiments of the present techniques are described in connection with preferred embodiments. However, to the extent that the following description is specific to a particular embodiment or a particular use of the present techniques, this is intended to be for exemplary purposes only and simply provides a description of the exemplary embodiments. Accordingly, the present techniques are not limited to the specific embodiments described below, but rather, such techniques include all alternatives, modifications, and equivalents falling within the true spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

"Coarsening" refers to reducing the number of cells in simulation models by making the cells larger, for example, representing a larger space in a reservoir. Coarsening is often used to lower the computational costs by decreasing the number of cells in a reservoir model prior to generating or running simulation models.

"Computer-readable medium" or "non-transitory, computer-readable medium," as used herein, refers to any non-transitory storage and/or transmission medium that participates in providing instructions to a processor for execution. Such a medium may include, but is not limited to, non-volatile media and volatile media. Non-volatile media includes, for example, NVRAM, or magnetic or optical disks. Volatile media includes dynamic memory, such as main memory. Common forms of computer-readable media include, for example, a floppy disk, a flexible disk, a hard disk, an array of hard disks, a magnetic tape, or any other magnetic medium, magneto-optical medium, a CD-ROM, a holographic medium, any other optical medium, a RAM, a PROM, and EPROM, a FLASH-EPROM, a solid state medium like a memory card, any other memory chip or cartridge, or any other tangible medium from which a computer can read data or instructions.

As used herein, "to display" or "displaying" includes a direct act that causes displaying of a graphical representation of a physical object, as well as any indirect act that facilitates displaying a graphical representation of a physical object. Indirect acts include providing a website through which a user is enabled to affect a display, hyperlinking to such a website, or cooperating or partnering with an entity who performs such direct or indirect acts. Thus, a first party may operate alone or in cooperation with a third party vendor to enable the information to be generated on a display device. The display device may include any device suitable for displaying the reference image, such as without limitation a virtual reality display, a 3-D display, a CRT monitor, a LCD monitor, a plasma device, a flat panel device, or printer.

"Exemplary" is used exclusively herein to mean "serving as an example, instance, or illustration." Any embodiment described herein as "exemplary" is not to be construed as preferred or advantageous over other embodiments.

"Flow simulation" is defined as a numerical method of simulating the transport of mass (typically fluids, such as oil, water and gas) or energy through a physical system using a simulation model. The physical system may include a three-dimensional reservoir model, fluid properties, and the number and locations of wells. Flow simulations may use or provide a way to evaluate a strategy (often called a well-management strategy) for controlling injection and production rates. These strategies can be used to maintain reservoir pressure by replacing produced fluids with injected fluids (for example, water and/or gas). When a flow simulation correctly recreates a past reservoir performance, it is said to be "history matched," and a higher degree of confidence is placed in its ability to predict the future fluid behavior in the reservoir.

"Permeability" is the capacity of a rock to transmit fluids through the interconnected pore spaces of the rock. Permeability may be measured using Darcy's Law: $Q=(k \Delta P A)/(\mu L)$, wherein Q=flow rate ($cm^3/s$), $\Delta P$=pressure drop (atm) across a cylinder having a length L (cm) and a cross-sectional area A ($cm^2$), $\mu$=fluid viscosity (cp), and k=permeability (Darcy). The customary unit of measurement for permeability is the millidarcy. The term "relatively permeable" is defined, with respect to formations or portions thereof, as an average permeability of 10 millidarcy or more (for example, 10 or 100 millidarcy).

"Pore volume" or "porosity" is defined as the ratio of the volume of pore space to the total bulk volume of the material expressed in percent. Porosity is a measure of the reservoir rock's storage capacity for fluids. Porosity is preferably determined from cores, sonic logs, density logs, neutron logs or resistivity logs. Total or absolute porosity includes all the pore spaces, whereas effective porosity includes only the interconnected pores and corresponds to the pore volume available for depletion.

A "reservoir" or "reservoir formation" is defined as a pay zone (for example, hydrocarbon producing zones) that include sandstone, limestone, chalk, coal and some types of shale. Pay zones can vary in thickness from less than one foot (0.3048 m) to hundreds of feet (hundreds of m). The permeability of the reservoir formation provides the potential for production.

"Reservoir properties" and "reservoir property values" are defined as quantities representing physical attributes of rocks containing reservoir fluids. The term "reservoir properties" as used in this application includes both measurable and descriptive attributes. Examples of measurable reservoir property values include porosity, permeability, water saturation, and fracture density. Examples of descriptive reservoir property values include facies, lithology (for example, sandstone or carbonate), and environment-of-deposition (EOD). Reservoir properties may be populated into a reservoir framework to generate a reservoir model.

"Reservoir simulation model" refers to a specific mathematical representation of a real hydrocarbon reservoir, which may be considered to be a particular type of geologic model. Reservoir simulation models are used to conduct numerical experiments (reservoir simulations) regarding past performance in order to verify that our understanding of the reservoir properties is correct and future performance of the field with the goal of determining the most profitable operating strategy. An engineer managing a hydrocarbon reservoir may create many different reservoir simulation models, possibly with varying degrees of complexity, in order to quantify the past performance of the reservoir and predict its future performance.

"Transmissibility" refers to the volumetric flow rate between two points at unit viscosity for a given pressure-drop. Transmissibility is a useful measure of connectivity. Transmissibility between any two compartments in a reservoir (fault blocks or geologic zones), or between the well and the reservoir (or particular geologic zones), or between injectors and producers, can all be useful for characterizing connectivity in the reservoir.

"Well" or "wellbore" includes cased, cased and cemented, or open-hole wellbores, and may be any type of well, including, but not limited to, a producing well, an experimental well, an exploratory well, and the like. Wellbores may be vertical, horizontal, any angle between vertical and horizontal, deviated or non-deviated, and combinations thereof, for example a vertical well with a non-vertical component. Wellbores are typically drilled and then completed by positioning a casing string within the wellbore. Conventionally, a casing string is cemented to the well face by circulating cement into the annulus defined between the outer surface of the casing string and the wellbore face. The casing string, once embedded in cement within the well, is then perforated to allow fluid communication between the inside and outside of the tubulars across intervals of interest. The perforations allow for the flow of treating chemicals (or substances) from the inside of the casing string into the surrounding formations in order to stimulate the production or injection of fluids. Later, the perforations are used to receive the flow of hydrocarbons from the formations so that they may be delivered through the casing string to the surface, or to allow the continued injection of fluids for reservoir management or disposal purposes.

Overview

Exemplary embodiments of the present invention provide techniques for using machine learning algorithms to generate solution surrogates for use in simulating a fluid flow in a reservoir such as a hydrocarbon reservoir. A simulation model may be segmented into a plurality of sub regions or coarse cells. Sets of training data may be obtained for a sub region by performing a full-physics simulation of the sub region. The training set may be used to compute the surrogate solution for the sub region through a machine learning algorithm such as a neural net. In some exemplary embodiments, the surrogate solution method may be an approximation of the inverse operator of a matrix equation for the fluid flow through a porous media. In some exemplary embodiments, the surrogate solution may be a formulation of Darcy's law, and supervised machine learning may be used to generate a coarse scale approximation of the phase permeability of a coarse grid cell. In some exemplary embodiments, the surrogate solution may be a constitutive relationship that approximates the flow response at a flux interface of a coarse cell or sub region. Furthermore, a reservoir simulation may include a combination of different types of surrogate solution methods for different regions of space or time. The surrogate solution computed for a sub region or coarse cell may be represented in some form that may be stored in a database for re-use in subsequent reservoir simulations.

FIG. 1 is a schematic view 100 of a reservoir 102, in accordance with an exemplary embodiment of the present techniques. The reservoir 102, such as an oil or natural gas reservoir, can be a subsurface formation that may be accessed by drilling wells 104, 106, and 108 from the surface 110 through layers of overburden 112. The wells 104, 106, and 108 may be deviated, such as being directionally drilled to follow the reservoir 102. Further, the wells can be branched to increase the amount of hydrocarbon that may be drained from the reservoir, as shown for wells 104 and 108. The wells 104, 106, and 108, can have numerous areas with perforations 120 (indicated as dots next to the wells) to allow hydrocarbons to flow from the reservoir 102 into the wells 104, 106, and 108 for removal to the surface. The reservoir 102 may have one or more faults 114 dividing areas, for example regions 116 and 118, which may either restrict or enhance the flow of hydrocarbons. A simulation model, or simulator, of the reservoir 102 is likely to find that the greatest changes occur in the vicinity of the wells 104, 106, and 108, and other reservoir features, such as the fault 114. Accordingly, it would be useful to keep fine structure in the vicinity of each of these features.

Figure 2:
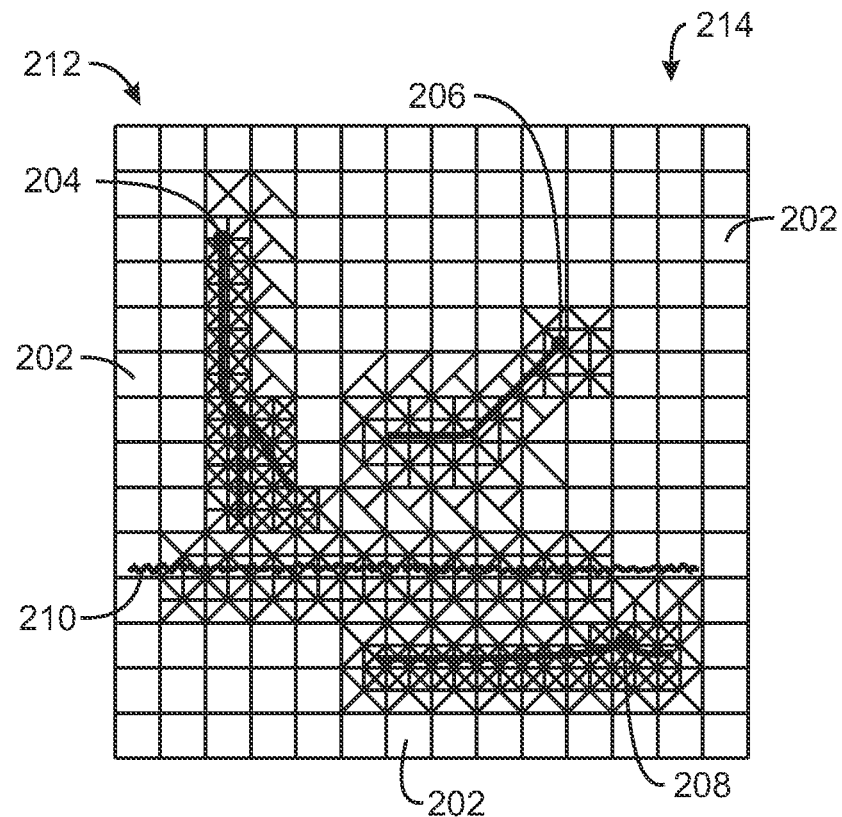
FIG. 2 is a top view of a reservoir showing a planar projection of a computational mesh over the reservoir, in accordance with an exemplary embodiment of the present techniques.

FIG. 2 is a top view of a reservoir showing a planar projection of a computational mesh 200 over the reservoir, in accordance with an exemplary embodiment of the present techniques. Although the computational mesh 200 is shown as a two dimensional grid of computational cells (or blocks) 202 to simplify the explanation of the problem, it should be understood that the actual computational mesh 200 can be a three dimension matrix of computational cells 202 that encompasses the reservoir. Further, the computational cells 202 may be of any size or shape, resulting in an unstructured grid. Generally, a computational cell 202 is a single two or three dimensional location within a simulation model that represents a physical location in a reservoir. Computational cell 202 may be represented by a functional relationship, or "solution surrogate," generated by a machine learning technique, such as a neural net, probability tree, support vector machine, radial basis functions, and the like. Computational cells 202 may interact with adjacent computational cells 202, for example, by having flux properties assigned to a shared border with the adjacent computational cells 202. The flux properties may include heat or mass transfer driven by a difference in temperature or pressure between the adjacent computational cells 202.

The computational mesh 200 can be coarsened in areas that may have less significant changes, for example, by combining computational cells 202 that are not in proximity to a well or other reservoir feature. Similarly, as shown in FIG. 2, the computational mesh 200 may retain a fine mesh structure in the vicinity of wells or other reservoir features, such as the first well 204, or other reservoir features, for example, a second well 206, a third well 208, a fault 210, or any other features that may show larger changes than other areas. The computational mesh 200 may be used to model a reservoir as discussed further with respect to FIG. 3.

Workflow for Modelling a Reservoir

Figure 3:
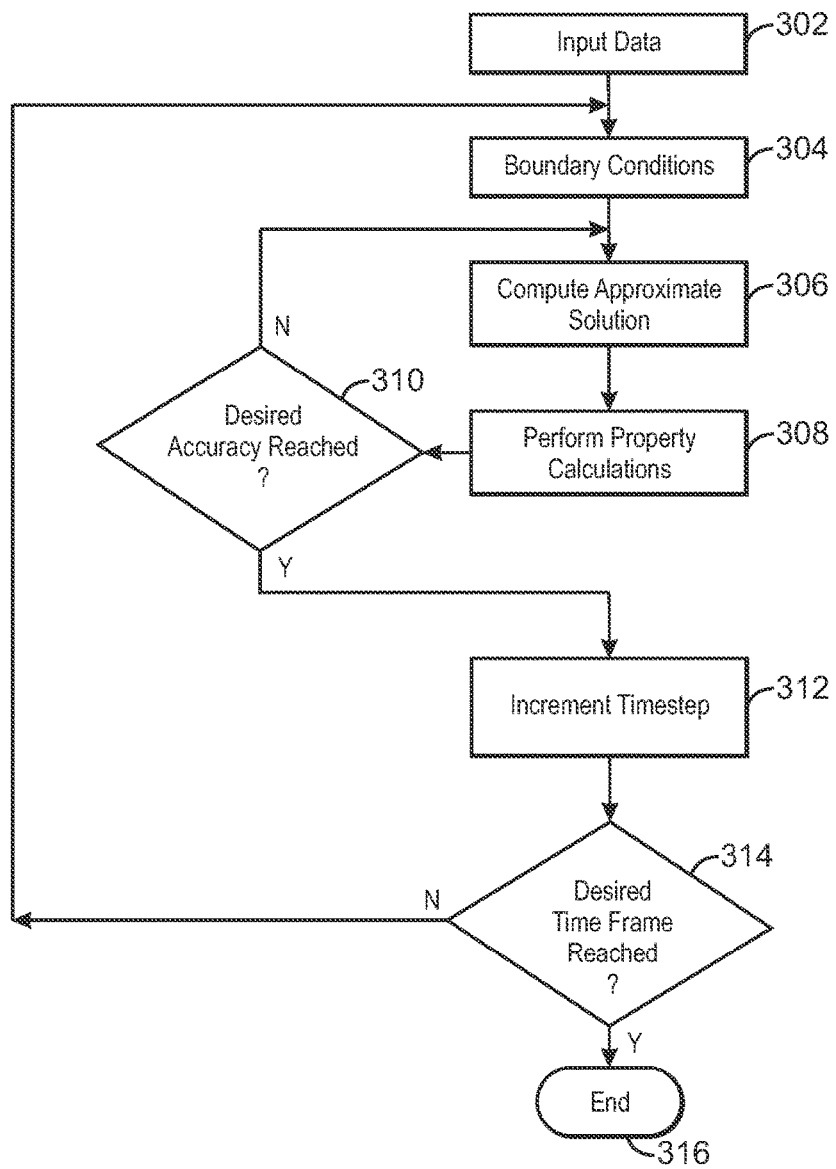
FIG. 3 is a process flow diagram of a workflow for modelling a reservoir, in accordance with an exemplary embodiment of the present techniques.

FIG. 3 is a process flow diagram of a workflow 300 for modelling a reservoir, in accordance with an exemplary embodiment of the present techniques. Although the discretization (coarsening) and the level of implicitness (which state variables, such as pressure or saturation, are treated implicitly or explicitly in the formulation) of the solution process varies, simulation models may perform in a similar fashion as workflow 300. A simulation model can begin at block 302 by parsing user input data. The input data may include the problem formulation, a geologic model that is discretized into grid blocks with physical properties defined at each grid block, including rock properties (such as permeability) and fluid properties (such as transmissibility). At block 304, boundary conditions for the simulation may be calculated, for example, from the governing equations.

At block 306, a linear solver may use a Jacobian matrix to generate an approximate solution for the simulation. Additionally, the approximate solution may be computed using a solution surrogate generated according to the machine learning techniques discussed herein. At block 308, physical properties are calculated from the approximate solution. At block 310, the calculated properties are compared to either previously calculated properties or to measured properties to determine whether a desired accuracy has been reached. In an exemplary embodiment, the determination is made by identifying that the calculated properties have not significantly changed since the last iteration (which may indicate convergence). For example, convergence may be indicated if the currently calculated properties are within 0.01%, 0.1%, 1%, 10%, or more of the previously calculated properties. In other embodiments, the determination may be determining if the calculated properties are sufficiently close to measured properties, for example, within 0.01%, 0.1%, 1%, 10%, or more. If the desired accuracy is not reached, process flow returns to block 306 to perform another iteration of the linear solver.

If at block 310, the desired accuracy has been reached, process flow proceeds to block 312, at which results are generated and the time is incremented by a desired time step. The results may be stored in a data structure on a tangible, machine readable medium, such as a database, for later presentation, or the results may be immediately displayed or printed after generation. The time step may be, for example, a day, a week, a month, a year, 5 years, 10 years or more, depending, at least in part, on the desired length of time for the simulation. At block 314, the new time is compared to the length desired for the simulation. If the simulation has reached the desired length of time, the simulation ends at block 316. If the time has not reached the desired length, flow returns to block 304 to continue with the next increment. The simulation time frame may be a month, a year, five years, a decade, two decades, five decades, or a century or more, depending on the desired use of the simulation results.

Computing an Approximate Solution

The techniques described below use the concept of supervised machine learning to generate the approximate solution at block 306 of method 300. Computing the approximate solution at block 306 may involve determining a different solution surrogate for each of the coarse cells or sub regions involved in the simulation. Various machine-learning techniques may be used to generate the solution surrogate. The machine learning algorithm may operate on data set, D, represented by the formula shown in Eqn. 1.

$$D:\{\vec{x}_i, \vec{y}_i, i=1\ldots n\}$$ Eqn. 1

In the above equation, "x" represents a set of known input vectors, "y" represents a set of corresponding real-valued outputs, and "n" represents the total number of samples. The machine learning algorithm may be used to determine, using this limited information, the dependence shown in Eqn. 2.

$$\vec{y} = M(\vec{x}, \vec{w})$$ Eqn. 2

In the above equation, "w" represents model parameters that describe the functional relationship between the input vectors, x, and output vectors, y. The dependence may be generated by finding values for the model parameters, w, that provide a suitable approximation of the output vectors, y, when compared to a training set, which represents a set of desired outputs values.

Figure 4:
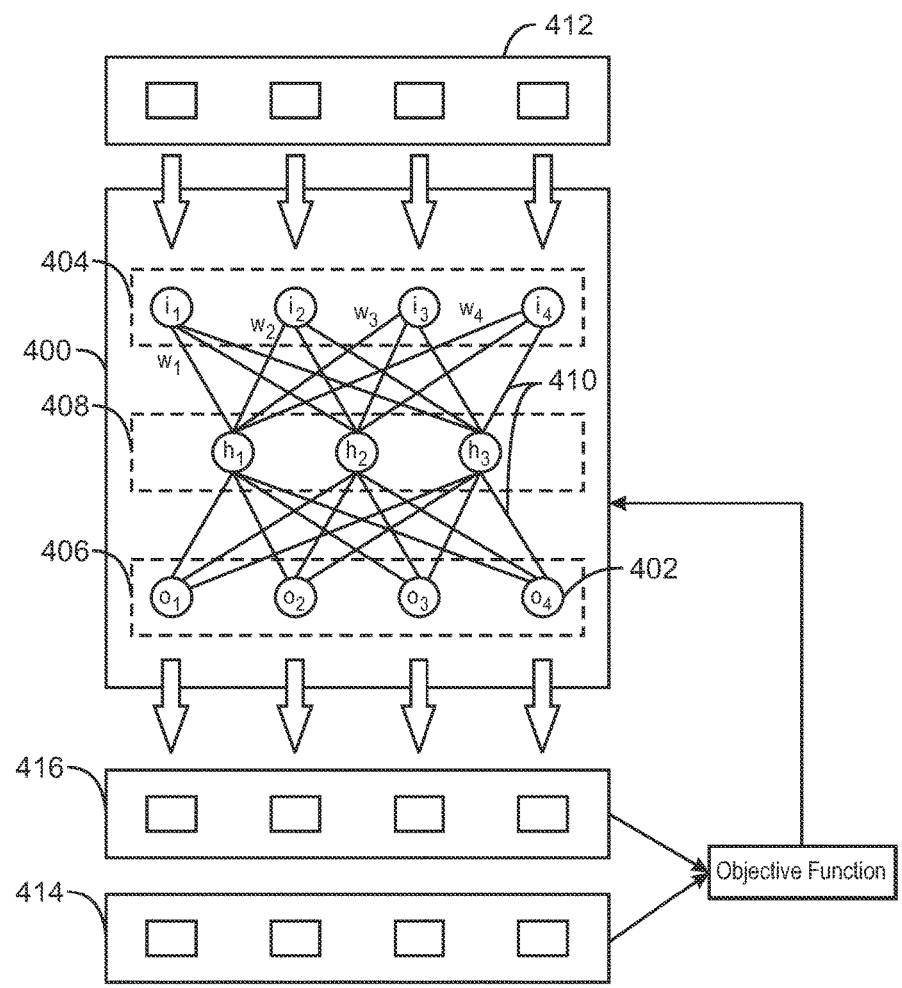
FIG. 4 is a schematic view of an exemplary neural net, in accordance with an exemplary embodiment of the present techniques.

FIG. 4 is a schematic view of an exemplary neural net 400 that may be used in embodiments of the present techniques. The neural net 400 may include a network of nodes 402. The neural net 400 may include an input layer 404, an output layer 406 and one or more hidden layers 408. Each node 402 in a layer may be connected to the nodes 402 of a preceding layer by a connection 410 characterized by a weighting value, w. The value computed for any given node may be a function of the values at each connected node in the preceding layer modified by the weighting values, w. For example, the node labeled "$h_1$" may be computed by the formula shown in Eqn. 3.

$$h_1 = f(w_1 i_2 + w_2 i_2 + w_3 i_3 + w_4 i_4)$$ Eqn. 3

A training set including a set of inputs 412 and a set of desired outputs 414 may be used to train the neural net 400, e.g., to set the values of the weights. A set of inputs 412 may be fed into the input layer 404 of the neural net 400. Node values may then be computed for each node in the hidden layer 408. If the neural net includes more than one hidden layer 408, node values are successively computed for each subsequent hidden layer 408. Node values are then computed for the output layer 406 to generate a set of outputs 416 of the neural net. The set of outputs 416 may be compared to a desired output set 414 to determine a measure of the deviation, sometimes referred to as an "objective function" or "cost function," between the set of computed outputs 416 and the desired output set 414. The desired output set 414 may be generated by a full-physics simulation of the system under consideration or based on measured characteristics of the system. The objective function computed for one iteration of the neural net computation may be used to alter the weighting values applied to each of the node connections 410 for the next iteration of the neural net computation. The neural net may be iteratively computed and the calculation of the objective function repeated until the objective function is below an acceptable threshold. After the last iteration of the neural net, the weight values correspond to an approximation of the response function of the system under consideration. The weight values may be extracted and used as a solution surrogate for a sub-region, as discussed with respect to FIG. 5, below.

It will be appreciated that the exemplary neural net described herein is used to introduce concepts of machine learning. In actual practice, the neural net may be any suitable neural net, including any number of hidden layers 408 and any number of nodes 402 per layer, as well as any other proper topology of neuron connections. Further, it will be appreciated that embodiments may include other supervised machine learning techniques, such as probabilistic trees, support vector machines, radial basis functions, and other machine learning techniques.

Approximating the Inverse Operator

In an exemplary embodiment, the solution surrogate may be an approximation of the inverse operator of a matrix equation that relates the fluid flow through a porous media with the boundary conditions of the corresponding grid cell. When discretized on a numerical grid, the set of partial differential equations constructed for the implicit solution of fluid flow through a porous media with boundary conditions at a given time-step takes the general form of a matrix equation as shown in Eqn. 4.

$$A_{ij}x=b_i \qquad \text{Eqn. 4}$$

The structure of the matrix equation is determined by the type of boundary conditions, which may be a mixture of Neumann and Dirichlet boundary conditions. The values of the boundary conditions determine the values of $b_i$. In the above formula, 'x' is a vector of unknowns, which may be propagated over time, for example, state variables such as pressure and compositions at a grid cell. The matrix operator, A, depends on properties of the system. A solution of the unknown state variables, x, can be computed according to the formula shown in Eqn. 5.

$$x=A^{-1}b \qquad \text{Eqn. 5}$$

In an exemplary embodiment, the action of the inverse operator, $A^{-1}$, is approximated over an appropriate sub-region of the reservoir simulation model via machine learning methods in order to facilitate fast online use of the approximation as a solution surrogate during reservoir modeling.

Figure 5:
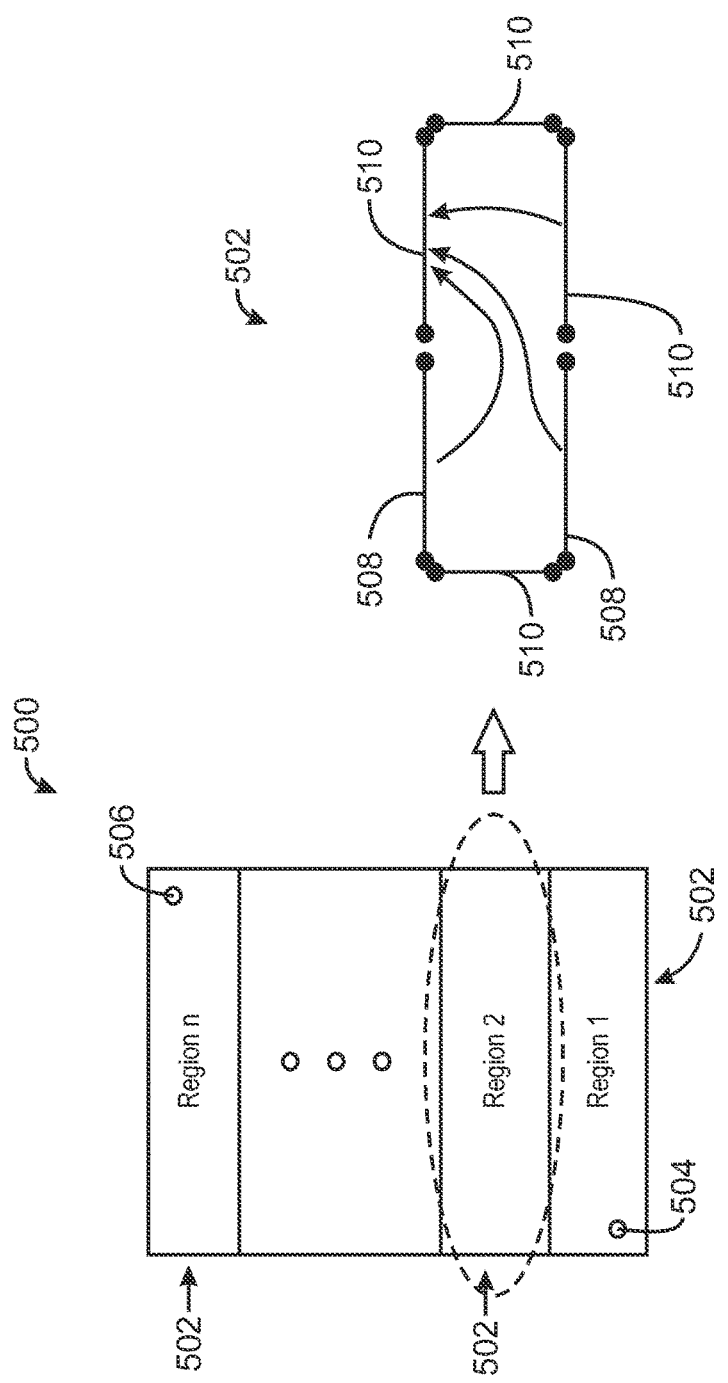
FIG. 5 is a schematic view of a reservoir simulation model, in accordance with an exemplary embodiment of the present techniques.

FIG. 5 is a schematic view of a reservoir simulation model, in accordance with an exemplary embodiment of the present techniques. The reservoir simulation model 500 may be divided into any suitable number of sub regions 502. The equations that describe the evolution of state variables such as pressure and composition for each sub region 502 may be represented by a matrix structure characterized by a set of physical, geometrical, or numerical parameters based on the geological characteristics of the matrix structure, such as rock porosity, phase permeability, and the like. A first region may include an injector well 504, and an nth region may include a producer well 506. Each sub region 502 may be characterized by a set of boundary conditions. Pressure boundaries may be of a Dirichlet boundary type that defines the pressure at the boundary between two sub regions 502 such as the boundary 508. Flux boundaries may be of a Neumann boundary type that describes the phase flow rate at the boundary between two regions such as depicted on boundary 510.

To compute the matrix equation solution for the sub region 502, the sub region's boundaries may be partitioned into representative sets by type, for example, flux boundaries and pressure boundaries. For each set of boundary condition types, a set of boundary condition values may be specified that mimic the variety of potentially realistic boundary conditions. The matrix element values of each sub region 502 are determined by physical parameters of the system such as rock porosity, phase permeability, and the like. A training simulation may then be used to generate the training set, $\{b_s, x_s\}$, s=1 . . . S, where the boundary conditions, $b_s$, may be used as the input 412 to the neural net and, the state variables, $x_s$ may be used as the desired output 414 (FIG. 4). The resulting training set may be stored to a database along with the physical, geometrical, or numerical parameters used by the training simulation to generate the training set. As used herein, the training simulation refers to a numerically and computationally accurate reservoir simulation with enough resolution to capture all desired physical processes. In other words, the training simulation can be a high resolution, highly accurate reservoir simulation that is based on Finite Element Analysis, Finite Difference Analysis, among other mathematical simulation techniques. In embodiments, the training simulation may be a finely meshed, full physics reservoir simulation.

The dependence, $x_i = A_{ij}^{-1} b_i$, can be approximated for the sub region 502 by a machine learning method such as a neural net, $x_i = [A_{ij}^{-1}]_{NN} b_i$, with n inputs and m outputs. In exemplary embodiments, the B and X sets are a priori bounded, where $b_i \in B \subset R^n$ and $x_i \in X \subset R^m$ and m≤m. Further, the training set, $\{b_s, x_s\}$, s=1 . . . S, contains a good distribution within the desired parameter space, and S is large, for example, S>3×n×m. In some embodiments, the set of boundary conditions, $b_i$, uniquely determines the solution, $x_i$. In some embodiments, a non-unique scenario may be identified during the training phase. For example, the problem may be reduced or approximated by a similar problem with a unique solution or the set of boundary conditions may reveal that they are not good candidates for this approach. If a neural net is properly trained (to small error), it will compute the unique solution for every new or old region. Practical remedies to prevent non-unique solutions are either to split the region in smaller parts, or consider inputs both from the current and previous time steps. Sometimes using additional inputs (such as state integrals) may work. In general the ambiguity is inherited from the inverse operator approximation process, which may not have a guaranteed unique solution. The matrix equation solution computed for each sub region 502 may then be used as the solution surrogate for computing the approximate solution at block 306 of method 300 (FIG. 3). Furthermore, the solution surrogate and the associated physical, geometrical, or numerical parameters may be stored to a database to be re-used in subsequent reservoir simulations.

Figure 6:
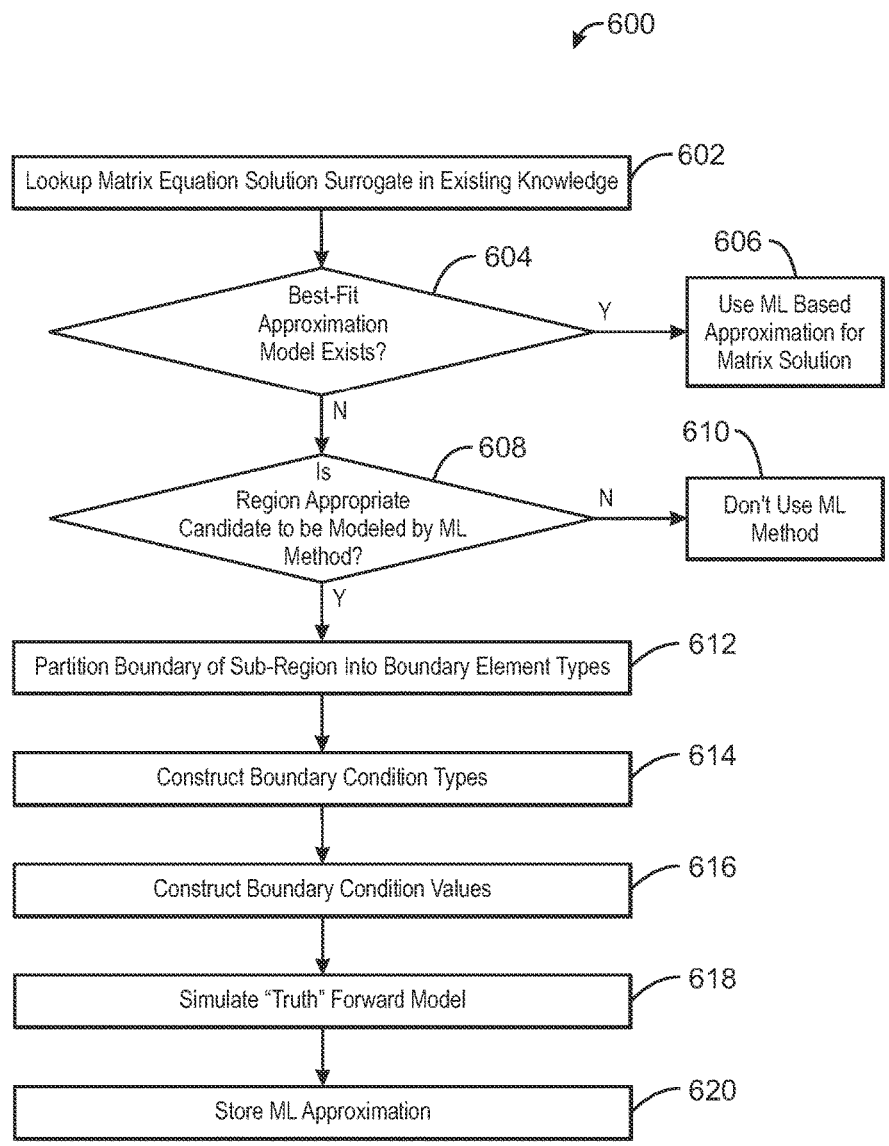
FIG. 6 is a process flow diagram of a method for computing the solution surrogate for each sub region of a reservoir model, in accordance with an exemplary embodiment of the current invention.

FIG. 6 is a process flow diagram of a method 600 for looking up and using an existing trained surrogate model or computing a new solution surrogate for each sub region 502 of a reservoir model, as needed, in accordance with an exemplary embodiment of the current invention. The method 600 starts at block 602, wherein the database of solution surrogates is searched to identify a solution surrogate that represents a suitable approximation of the sub region 502 (FIG. 5), based on a comparison of the physical, geometrical, or numerical parameters of the sub region and the solution surrogate. Examples of parameters that may serve as lookup keys for sub-regions and their surrogate model solutions include, but are not limited to row sum or column sum vectors, diagonal vectors, L1, L2, LN norms of these vectors, and so on. Physical parameters describing the sub-region may also serve as useful lookup keys. Examples of physical parameters that may serve as lookup keys include, but are not limited to, average permeability, porosity, or mobility of the sub-region or vectors of distributions of these physical variables. Examples of numerical parameters that may serve as lookup keys include, but are not limited to, time step size and geometrical descriptions of the regions, among others.

At block 602, a determination is made regarding whether a solution surrogate representing a suitable approximation of the sub region 502 exists in the database. If a suitable approximation is identified, the process flow may advance to block 606, wherein the solution surrogate obtained from the database is used to generate the state variables, $x_i$, of the sub region 502. If a suitable approximation is not identified, the process flow may advance to block 608.

At block 608, a determination is made regarding whether the sub region 502 is a candidate to be modeled by the machine learning method described above. Such regions may be identified by any combination of computational, analytical and interpretive methods such as seismic pattern recognition and expert analysis of the geological structure, rock properties, or experience in applying such methods. The sub region 502 may be a candidate to be modeled by the machine learning method if the heterogeneity of the rock porosity and permeability may be accurately described using a few parameters and the sub regions flow response to different boundary conditions can be captured by the solution surrogate as determined during the training period. Examples of such parameters include, but are not limited to, average permeability, porosity, or mobility of the sub-region or vectors of distributions of these physical variables. If the sub region 502 is not a candidate to be modeled by the machine learning method, the process flow may advance to block 610, and machine learning techniques for computing the solution surrogate of the sub region 502 are not used for the particular sub region 502 under consideration.

If, at block 608, it is determined that the sub region 502 is a candidate to be modeled by the machine learning method, the process flow may advance to block 612. At block 612, the boundary of the sub region may be partitioned into a plurality of boundary element types. For the sub region 502 under consideration, the region's boundary may be partitioned into an appropriate set of boundary elements that will represent the variety of anticipated boundary element types this region is likely to encounter as part of a reservoir simulation model. For example, the boundary element types may include a combination of pressure boundaries 508 and flux boundaries 510, as discussed in relation to FIG. 5.

At block 614, the boundary condition types may be specified. For example, boundary condition types may include Neumann boundaries, Dirichlet boundaries, as well as other boundary types, and combinations thereof.

At block 616, boundary condition values may be specified for each of the boundary elements. The boundary condition values may include any suitable sampling of the boundary parameter space. In some embodiments, the boundary condition values may be specified based on known conditions of an actual reservoir. For example, the boundary condition values for the flux boundaries 108 may be based on a known fluid production rate of the producer well 506 or a known fluid injection rate at the injector well 504. The boundary condition values for the flux boundaries 108 may also be based on the physical characteristics of the reservoir, for example, well casings, fault lines, and the like.

At block 618, a training simulation may be used to generate the training set 416, $\{b_s,x_s\}$, s=1 . . . S. Input to the training simulation may include, the boundary condition values determined at block 616 and the physical, geometrical, or numerical parameters of the sub region determined at block 608. The training simulation may include, for example, finite element analysis of the sub region 502 using a fine mesh model of the sub region 502. The training set 416 generated by the training simulation may then be used to compute the solution surrogate, using the machine learning techniques described above.

At block 620, the solution surrogate may be stored to a database of solution surrogates. Each solution surrogate in the database may be paired with the corresponding physical, geometrical, or numerical parameters used to generate the training set 416. In this way, the solution surrogate may be reused for future reservoir simulations based on a degree of similarity between the physical, geometrical, or numerical parameters used to the generate the solution surrogate and the physical, geometrical, or numerical parameters of subsequent sub regions 102 used for future reservoir simulations. The method 600 may be repeated for each sub region 502 included in the reservoir simulation.

During block 306 of the method 300 for modeling the reservoir, the matrix equation solution generated at block 620, or retrieved from the database at block 606, may be used to generate the state variables of the sub region 502 during the computation of the approximate solution (block 306 of method 300). Generation of the state variable may be accomplished by using the solution surrogate and a different set of boundary conditions from the original boundary conditions used to generate the solution surrogate. For example, boundary conditions for one sub region 502 may be based on the state variables previously computed for an adjacent sub region 502.

In some exemplary embodiments, the training and exploitation of the Neural net allows apparently non-similar sub-regions to contribute to each other's teachings. This may occur if, for example, the matrix equation derived by a discretized form of the reservoir simulation yields, for some boundary elements, a similar form as that from another region with different physical properties. This may be possible because the abstraction imposed by this approach will allow homogenization of different physical properties in the discretized form of the matrix equation.

Computing a Coarse Scale Approximation

In some embodiments, a reservoir simulation may be performed by dividing the reservoir model into a plurality of coarse grid cells. The state variables for each coarse grid cell may be computed using a formulation of Darcy's Law. Supervised machine learning may be used to generate a coarse scale approximation of the phase permeability of the coarse grid cell, which may be used during the computation of the approximate solution at block 306 of method 300. Computing the approximate solution at block 306 may involve determining a different coarse scale approximation of the phase permeability for each of the coarse grid cells or cell faces involved in the simulation.

The multi-phase extension of Darcy's law, yields the formula shown in Eqn. 6.

$$\vec{v}_v = -\frac{1}{\mu_v}\overline{K}_v \nabla P_v \qquad \text{Eqn. 6}$$

In the above equation, $\overline{K}_v$ is phase permeability which contains both the absolute and relative phase permeability, $\mu_v$ is the phase viscosity, and the pressure gradient, $\nabla P_v$, may include saturation dependent capillary pressure and gravity force. Thus, the phase velocity, $\vec{v}_v$, is a function of potential gradient and phase permeability, which is itself a function of phase saturation and scale lengths.

Figure 7:
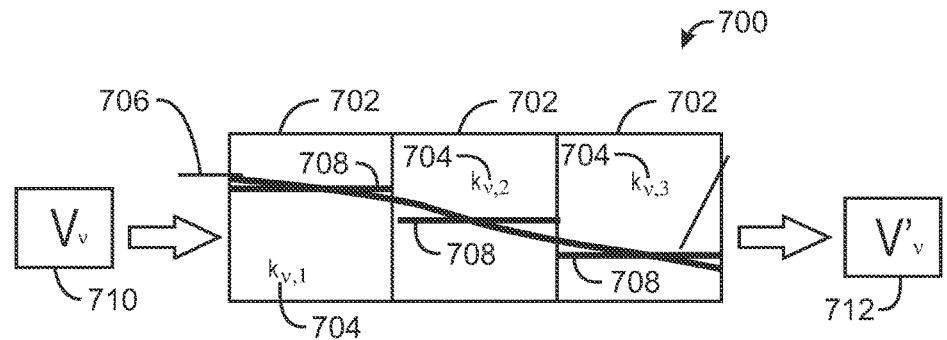
FIG. 7 is a one-dimensional model of a coarse grid cell, in accordance with an exemplary embodiment of the present techniques.

FIG. 7 is a one-dimensional model of a coarse grid cell 700, in accordance with an exemplary embodiment of the present techniques. The coarse grid cell shown in FIG. 7 includes a cluster of three fine grid cells 702, each of which may be characterized by a fine grid permeability 704. The line 706 represents actual phase saturation across the three fine grid cells 702. The actual phase saturation may be discretized for each fine grid cells 702, as shown by lines 708, which represents the discretized scalar saturation of phase in each of the fine grid cells 702. The boundary conditions of the coarse cell may include an input phase velocity 710 and output phase velocity 712. The coarse scale approximation of the phase permeability for the coarse grid cell 700 may be characterized as a function of the fine grid permeability of each of the fine grid cells. The fine grid permeability of each of the fine grid cells is a function of saturation and, therefore, time. For example, the coarse scale approximation of the phase permeability of the coarse grid cell 700 at the end of the fine grid time steps may be a function of the phase permeability history of the fine grid cells 702, as represented by the formula shown in Eqn. 7.

$$k_{v,\text{effective}}(t^n) = f[k_{v,1}(S_{v,1}(t^n)), k_{v,2}(S_{v,2}(t^n)), k_{v,3}(S_{v,3}(t^n)), k_{v,1}(S_{v,1}(t^{n-1})), k_{v,2}(S_{v,2}(t^{n-1})), k_{v,3}(S_{v,3}(t^{n-1})), \ldots, \text{scale\_length\_param}]$$ Eqn. 7

In the above formula, $K_{v,\text{effective}}(t^n)$ equals the coarse scale approximation of the coarse grid cell 700 at a time step, n. The term $K_{v,i}$ equals the discretized phase permeability at each fine grid cell, and the term $S_{v,i}$ equals the phase saturation at each fine grid cell. For two-dimensional or three-dimensional models, the effective phase permeability can be written as a tensor as shown in Eqn. 8.

$$\begin{pmatrix} v_{v,x} \\ v_{v,y} \end{pmatrix} = -\frac{1}{\mu_v} \begin{pmatrix} kk_{v,xx} & kk_{v,xy} \\ kk_{v,yx} & kk_{v,yy} \end{pmatrix} \begin{pmatrix} \nabla P_{v,x} \\ \nabla P_{v,y} \end{pmatrix}$$ Eqn. 8

Figure 8:
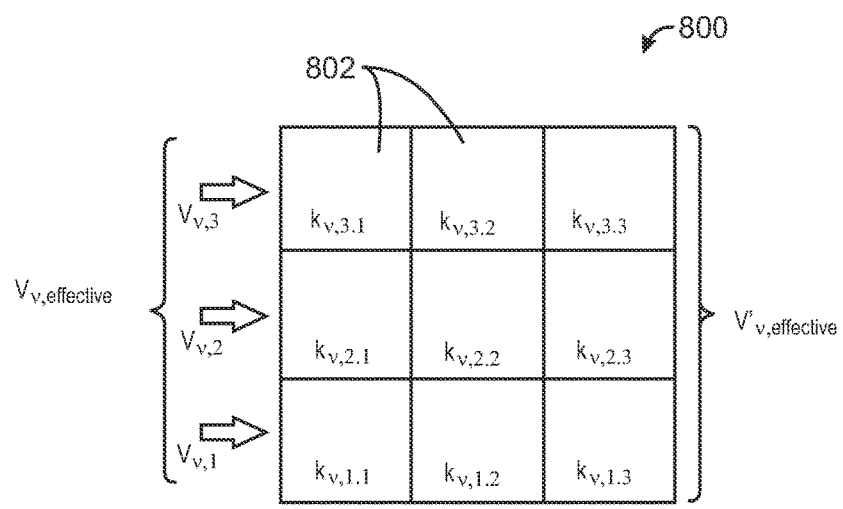
FIG. 8 is a two dimensional coarse grid cell, in accordance with an exemplary embodiment of the present techniques.

FIG. 8 is a two dimensional coarse grid cell, in accordance with an exemplary embodiment of the present techniques. The coarse grid cell shown in FIG. 8 includes a three-by-three matrix of nine fine grid cells. Each of the fine grid cells may be associated with a discretized phase permeability. The fine scale phase velocity at the cell interface is represented as, $V_{v,i}$. As indicated by the formula shown in Eqn. 9, the effective phase permeability tensor for the coarse cell may be a function of any of the model parameters of the fine grid, for example, the phase permeability, phase saturation, phase velocity, and the like.

$$k_{v,\text{effective}}(t) = f[k_{v,i}, S_{v,i}, V_{v,i}, \ldots, \text{model parameters,}]$$ Eqn. 9

Machine learning algorithms such as neural nets may be used to provide the effective permeability, k, on a specified coarse grid element given the boundary phase velocity. In such an embodiment, $k_{v,\text{effective}}$ is the output and $k_{v,i}$, $S_{v,i}$, $V_{v,i}$, and model parameters are input.

The saturation and velocity parameters in the independent variable list may be for all fluid phases. In some embodiments, global information may be used to generate a more realistic set of boundary conditions for the training, in which case model parameters in the equation above will include physical parameters for fine grid cells outside the boundary of the coarse grid cell 700. To increase the likelihood that the effective permeability may be re-used for multiple course grid cells, the parameter space should not be too large. The sampling of the parameter space can be chosen to enable sufficient coverage of the parameter space while increasing the probability that the effective permeability may be re-used for multiple coarse grid elements. Using the technique described above, effects such as hysteresis may be considered naturally as an extension of phase permeability scale up rather than a special physical process.

Figure 9:
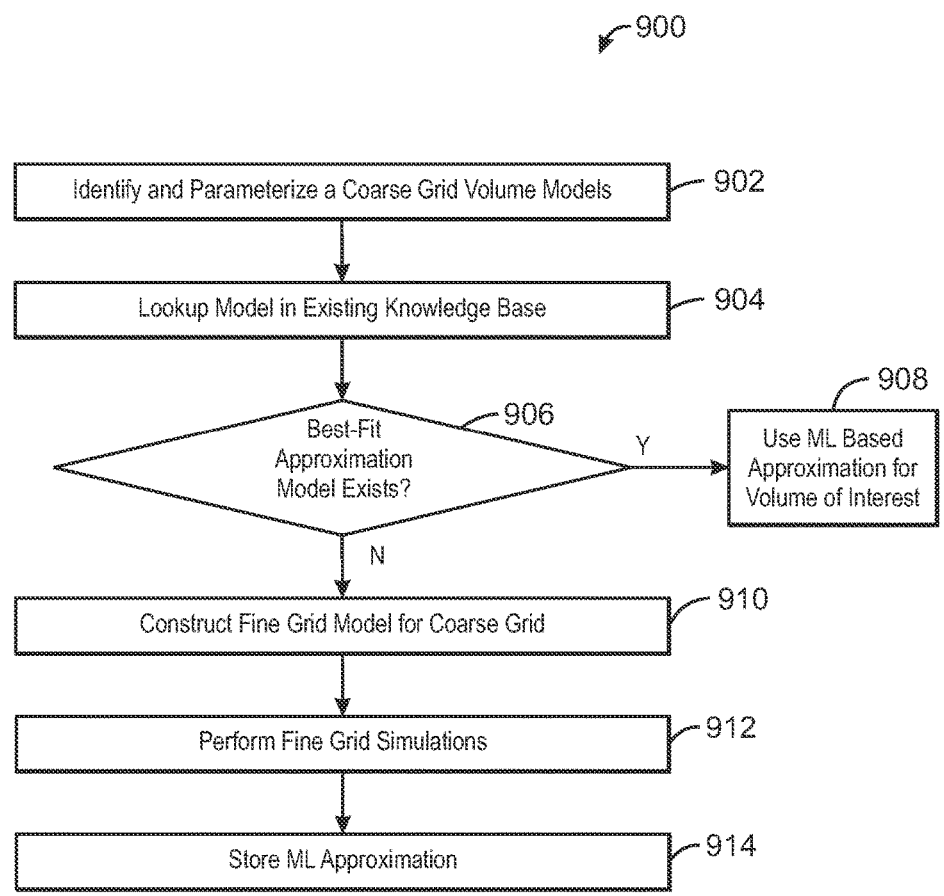
FIG. 9 is a process flow diagram of a method of performing a reservoir simulation using the coarse scale approximation of the phase permeability, in accordance with an exemplary embodiment of the present techniques.

FIG. 9 is a process flow diagram of a method 900 of performing a reservoir simulation using the coarse scale approximation of the phase permeability, in accordance with an exemplary embodiment of the present techniques. The method 900 may begin at block 902, wherein the reservoir model may be divided into a plurality of coarse grid cells 700 based on parameters such as heterogeneity and coarse scale fluid properties, for example, phase permeability, phase saturation, and the like.

At block 904, one of the coarse grid cells 700 generated at block 902 may be used to identify a matching coarse grid cell model in a database of previously processed coarse grid cells. Identifying the matching coarse grid cell model may include comparing the model training parameters of the present coarse grid cell 700 with the training parameters stored for each of the previously processed coarse grid cells to identify an existing model that more closely resembles the current model. As described above for the approximation of an inverse operator, metrics to compare and search for models may include mathematical parameters such as vectors of permeabilities, derived values of these parameters such as norms of the vectors, and model parameters such as those describing discretization and time stepping. For these examples, standard parameter distance metrics such as Euclidian distance may be used.

At block 906, a determination is made regarding whether a matching coarse grid cell model for the present coarse grid cell 700 has been identified. If a matching model has been identified, the process flow may advance to block 908. At block 908, the coarse scale approximation of the phase permeability associated with the previously computed coarse grid cell may be obtained from the database. The coarse scale approximation of the phase permeability obtained from the database may be used during the reservoir simulation to compute the state variables for the coarse grid cell 700.

If a matching model has not been identified at block 906, the process flow may advance to block 910. At block 910, a fine grid model is generated for the coarse grid cell. The coarse grid cell may be divided into a suitable number of fine grid cells 702. For each of the fine grid cells 702, a suitable set of boundary conditions that cover current and expected variations and physical, geometrical, or numerical parameters such as phase permeability may be specified.

At block 912, the fine grid training simulations may be performed over the coarse grid cell 700. The fine grid training simulations may be performed using a numerically and computationally accurate reservoir simulation with enough resolution to capture all desired physical processes, as described above in relation to FIG. 5. In this manner, a variety of simulated boundary conditions may be obtained. The simulated boundary conditions computed for the coarse grid cell 700 may be used to train the neural net to obtain the approximate phase permeability of the coarse grid cell 700. As described above, $k_{v,\text{effective}}$, is the output and $k_{v,i}, S_{v,i}, V_{v,i}$, and model parameters are input. Techniques such as over-sampling may be used to provide more realistic boundary conditions. The training may be performed for both steady state and dynamic conditions, with potentially any combination of physical effects such as capillary pressure and gravity.

At block 914, the approximate phase permeability of the coarse grid cell 700 may be stored to a database for re-use in subsequent reservoir simulations. Additionally, the model training parameters used to compute the approximate phase permeability may be stored to the database in association with the approximate phase permeability for use in determining whether the approximate phase permeability can be used for a given coarse grid cell encountered in a subsequent reservoir simulation.

The techniques discussed above provide for scale-up from the traditional geological model scale to reservoir simulation scale. In some embodiments, the present techniques can be applied to scale-up from the laboratory relative permeability measurements made on core.

Approximating a Constitutive Relationship

Figure 10:
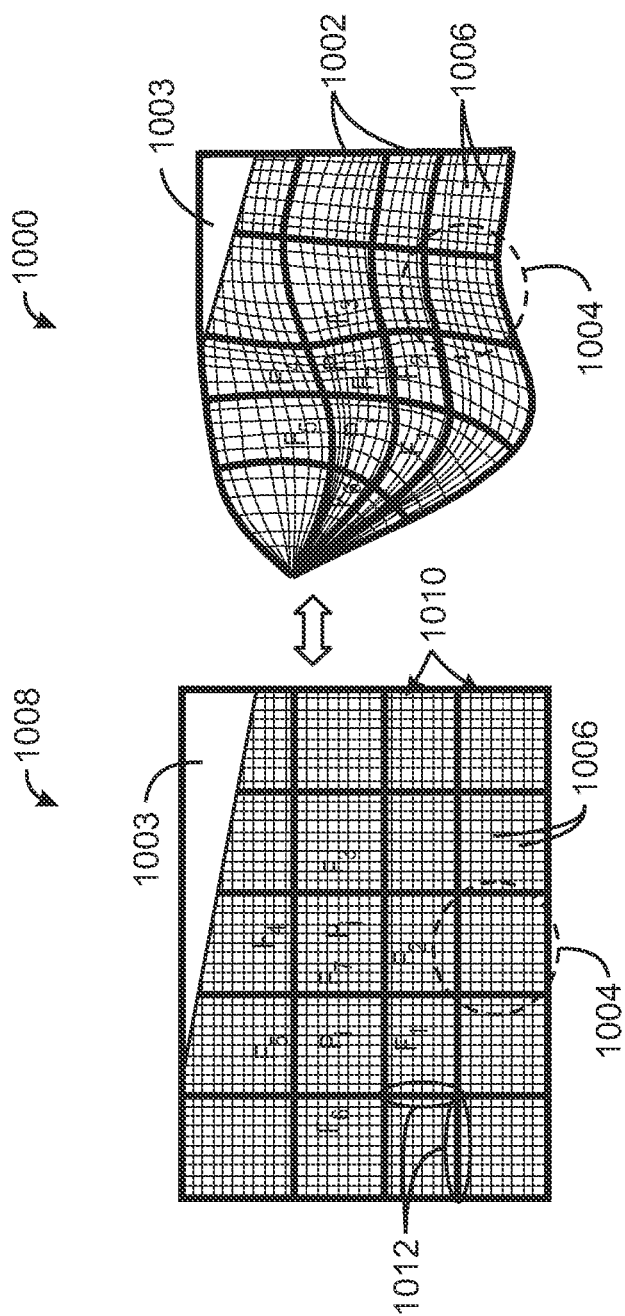
FIG. 10 is a two-dimensional view of a reservoir model showing a planar projection of a computational mesh, in accordance with an exemplary embodiment of the present techniques.

FIG. 10 is a two-dimensional view of a reservoir model showing a planar projection of a computational mesh, in accordance with an exemplary embodiment of the present techniques. The reservoir model may include an irregular, coarse mesh 1000, which may be a mesh of an actual physical space to be modeled. The coarse mesh 1000 may include irregular shaped coarse grid cells 1002. For example, the coarse mesh may include various geographical features such as an eroded region 1003. Each coarse grid cell 1002 may be further subdivided into a fine mesh 1004 that includes a plurality of fine grid cells 1006. Additionally, the coarse mesh 1000 of the actual physical space may be mapped to a reference mesh 1008. The reference mesh 1008 may be an orthogonal mesh that includes a plurality of rectangular coarse grid cells 1010, wherein each of the irregular shaped coarse grid cells 1002 may be mapped to a corresponding rectangular coarse grid cell 1010 of the reference mesh 1008. Each coarse grid cell 1012 may be associated with a corresponding potential, or pressure. The boundary between two coarse grid cells may be associated with a corresponding flux and may be referred to as flux interface 1012.

In some embodiments, supervised machine learning may be used to generate a constitutive relationship between the flow response at the flux interface 1012 and the pressure difference, or potential drop, between each of the coarse grid cells 1010 surrounding the flux interface 1012. Further, the constitutive relationship may account for the difference in geometry between the rectangular coarse grid cells 1040 of the reference mesh 1030 and the irregular coarse grid cells 1010 of the irregular mesh 1000. In this way, the constitutive relationship computed for the coarse grid cells 1010 of the reference mesh 1008 may be reused in future reservoir simulations wherein the shape of the coarse grid cells varies from the original cell shape on which the training was based.

The potential drop between two coarse grid cells 1010, $\Delta\Phi_{1-2}$, may be written as a function of the fluxes on the flux interface 1012 between two coarse grid cells 1010, $F_1$ . . . $F_7$, as represented by the formula shown in Eqn. 10.

$$\Delta\Phi_{1-2} = f(F_1, \ldots, F_7, \ldots, \text{geometry}, \overline{K}_v(S_v(t)), \text{params}) \quad \text{Eqn. 10}$$

Conversely, the flux at each flux interface 1012 may be written as a function of potential in the coarse grid cells 1010 surrounding the flux interface 1012, as represented by the formula shown in Eqn. 11.

$$F_7 = f(\Phi_1, \ldots, \Phi_8, \ldots, \text{geometry}, \overline{K}_v(S_v(t)), \text{params}) \quad \text{Eqn. 11}$$

In the above formulas, $F_i$ corresponds with a flux at a flux interface 1012 between two coarse grid cells 1004. The term $\Phi_i$ corresponds with the potential at one of the coarse grid cells 1010. The term "geometry" is a value that corresponds with the geometry of the irregular coarse grid cell 1002. The geometry may be parameterized using geometrical parameters such as grid cell height, width, depth, curvature on a side, and so on. The term "$\overline{K}_v(S_v(t))$" represents the phase permeability of the support region defined by the coarse grid cell, which is a function of the phase saturation at time step, t. The term "params" represents additional parameters that describe the system such as fluid properties.

The constitutive relationship between flux and pressure for each coarse grid cell 1010 may be computed using machine learning techniques, for example, using a neural net such as the neural net described in relation to FIG. 4. For example, in accordance with Eqn. 11, the input to the machine learning method such as the neural net may be $\Phi_i$, geometry, $\overline{K}_v(S_v(t))$, and params and the output may be the flux, F, on the boundary of the cell. Depending on the characteristics of the coarse grid cell 1010, the constitutive relationship between flux and pressure will generally not correspond with Darcy's Law. However, the constitutive relationship should degenerate to Darcy's law for simple discretization, isotropic effective properties, and orthogonal grids.

Figure 11:
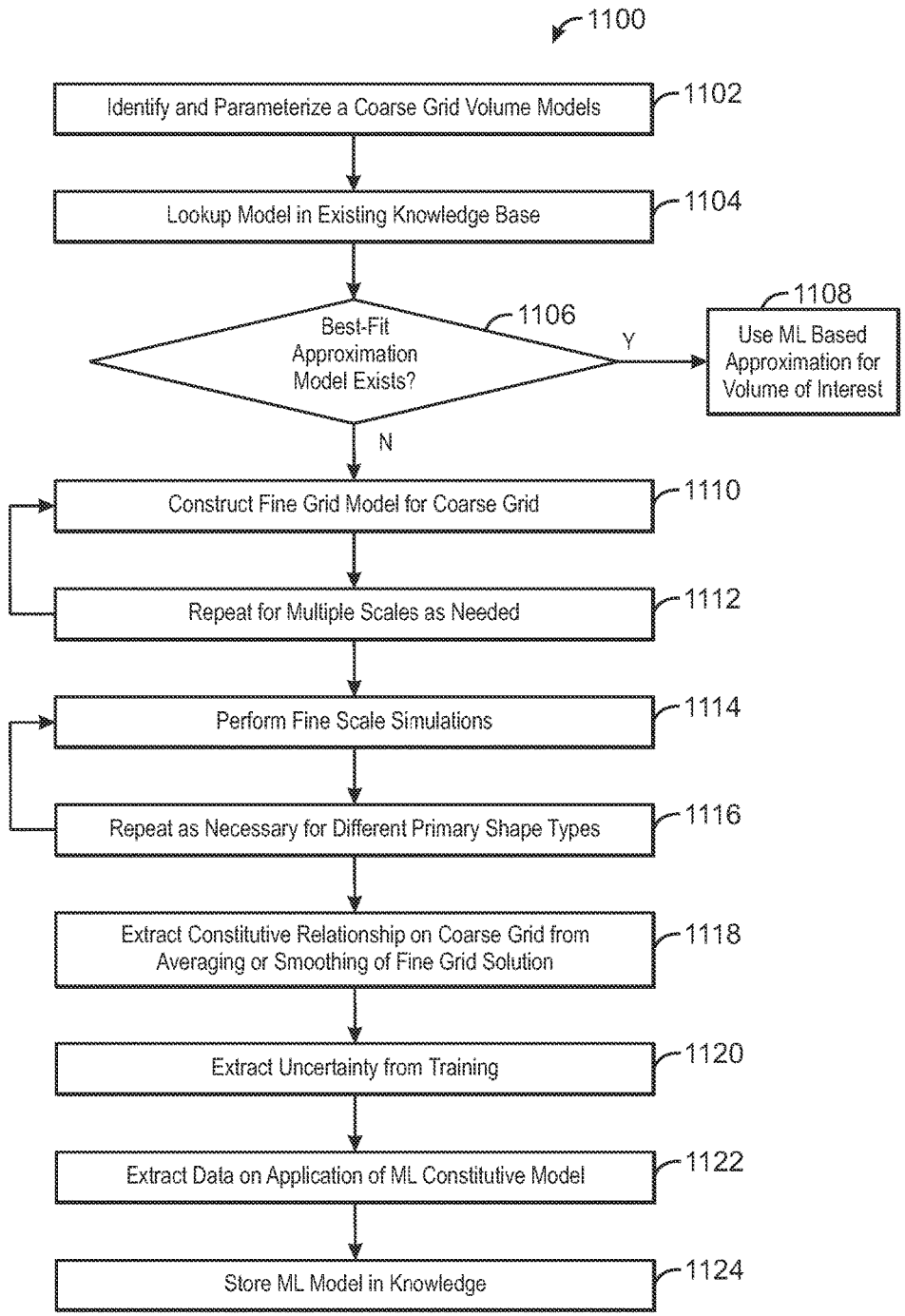
FIG. 11 is a process flow diagram of a method of performing a reservoir simulation using a constitutive relationship between pressure and flow, in accordance with an exemplary embodiment of the present techniques.

FIG. 11 is a process flow diagram of a method 1100 of performing a reservoir simulation using a constitutive relationship between pressure and flow, in accordance with an exemplary embodiment of the present techniques. The method 1100 may begin at block 1102, wherein a coarse grid simulation model for a reservoir is generated and parameterized by the terms in Eqn. 11, such as, $\Phi_i$, geometry, $\overline{K}_v(S_v(t))$, and params. The resulting simulation model may include a coarse mesh 1000 with a plurality of irregular shaped coarse grid cells 1002 (FIG. 10). A set of descriptive parameters such as phase permeability and cell geometry may be specified for each coarse grid cell 1002.

At block 1104, a flux interface 1012 is selected and a database of previously computed constitutive relationships may be searched to identify an existing constitutive relationship that may be used to compute the flow response for the flux interface 1012 (FIG. 10). Identifying the constitutive relationship may include comparing the parameters of the coarse grid cells 1012 surrounding the flux interface 1012 with the parameters of previously generated coarse grid cells 1012 to identify an existing model that closely resembles the current model. As described above for the approximation of an inverse operator, metrics to compare and search for models may include mathematical parameters such as vectors of permeabilities, geometry, permeability distribution of the surrounding coarse grid cells 1010 or derived values of these parameters such as norms of the vectors, and model parameters such as those describing discretization and time stepping. For these examples, standard parameter distance metrics such as Euclidian distance may be used.

At block 1106, a determination is made regarding whether a suitable approximation of the current flux interface 1012 model exists in the database of previously computed constitutive relationships. If a suitable approximation does exist, the process flow may advance to block 1108, wherein the previously computed constitutive relationship may be used for the selected flux interface 1012 during the reservoir simulation. During the simulation, the conservation laws, such as conservation of mass, momentum, angular momentum, energy, and the like, will be enforced across the flux interface 1012 between the coarse grid cells 1010.

If, at block 1106, a suitable approximation does not exist for the flux interface 1012, a new constitutive relationship may be computed for the selected flux boundary 1012 and the process flow may advance to block 1110. At block 1110, a fine mesh model may be generated for each of the coarse mesh cells 1010 surrounding the flux interface 1012. The fine mesh model may include a plurality of fine grid cells 1004 for each of the coarse grid cells 1010 surrounding the selected flux boundary 1012. As indicated by block 1112, block 1110 may be repeated for coarse grids of different scales (cell sizes) to increase the reusability of the resulting constitutive relationship computed for the flux boundary 1012. In this way, the constitutive relationship may be used to represent phenomena at different physical scales encountered for different simulation executions.

At block 1114, a fine scale simulation may be performed for each coarse grid cell 1004 using a training simulation, which may be a numerically and computationally accurate reservoir simulation with enough resolution to capture all desired physical processes, as described above in relation to FIG. 5. The fine scale simulation provides a set of boundary conditions and initial conditions, which may be used as the training set for training the neural net 400 (FIG. 4). For example, the input 412 of the neural net 400 may include the potential at each coarse grid cell 1006 as well as other parameters specified in Eqn. 11. The desired output 414 of the neural net 400 may include the flux at each interface between the coarse grid cells 1006. In some embodiments, over-sampling and other techniques are used to provide more realistic boundary conditions. The training may be performed for both steady state and dynamic conditions, with potentially any combination of physical effects such as capillary pressure and gravity, thus allowing for model reuse.

As indicated by block 1116, block 1114 may be repeated for coarse mesh cells 1004 of different primary shape types. The constitutive relationships derived for each different primary shape type may remain valid under mild geometrical deformation, which may be applied to construct a coarse grid model of a specific reservoir, and thus, will be reusable for different reservoirs.

At block 1118, the constitutive relationship between fluid flux and potential gradients for the selected flux interface 1012 may be extracted from the trained neural net 400. In some embodiments, the constitutive relationship used for training may be that of the fine grid solution after it has been averaged or smoothed.

At block 1120, fine grid simulations computed for each of the different mesh scales generated at block 1114 and 1116 may be evaluated to determine an uncertainty estimate for the coarse grid constitutive relationship. This may be done through numerical experiment using a variety of different fine scale parameter distributions. The uncertainty estimate is a measure of the accuracy of the constitutive relationships computed at different coarse scales. The uncertainty estimate may be used to determine an estimated level of geologic feature detail that will provide suitable accuracy during the generation of the training set used to train the neural net.

At block 1122, a determination may be made regarding which groups of parameters are more amendable to constitutive modeling and which groups of parameters are more amendable to full-scale simulation. Parameters that depend on material or geometrical parameters will tend to be more amendable to constitutive modeling, while parameters that are process dependant will tend to be more amenable to full-scale simulation. This determination may be made a-priori as well as by evaluating the sensitivity of the trained neural net 400 to small changes in material parameters and boundary conditions.

At block 1124, the constitutive relationship and the model training parameters used to generate the constitutive relationship may be stored to a database for future use in subsequent reservoir simulations. The model training parameters may include the coarse grid geometry, phase permeability tensor as a function of capillary pressure tables, and characteristics of the coarse grid model including the time dependent parameters.

Integration of Machine Learning Based Approximations

Figure 12:
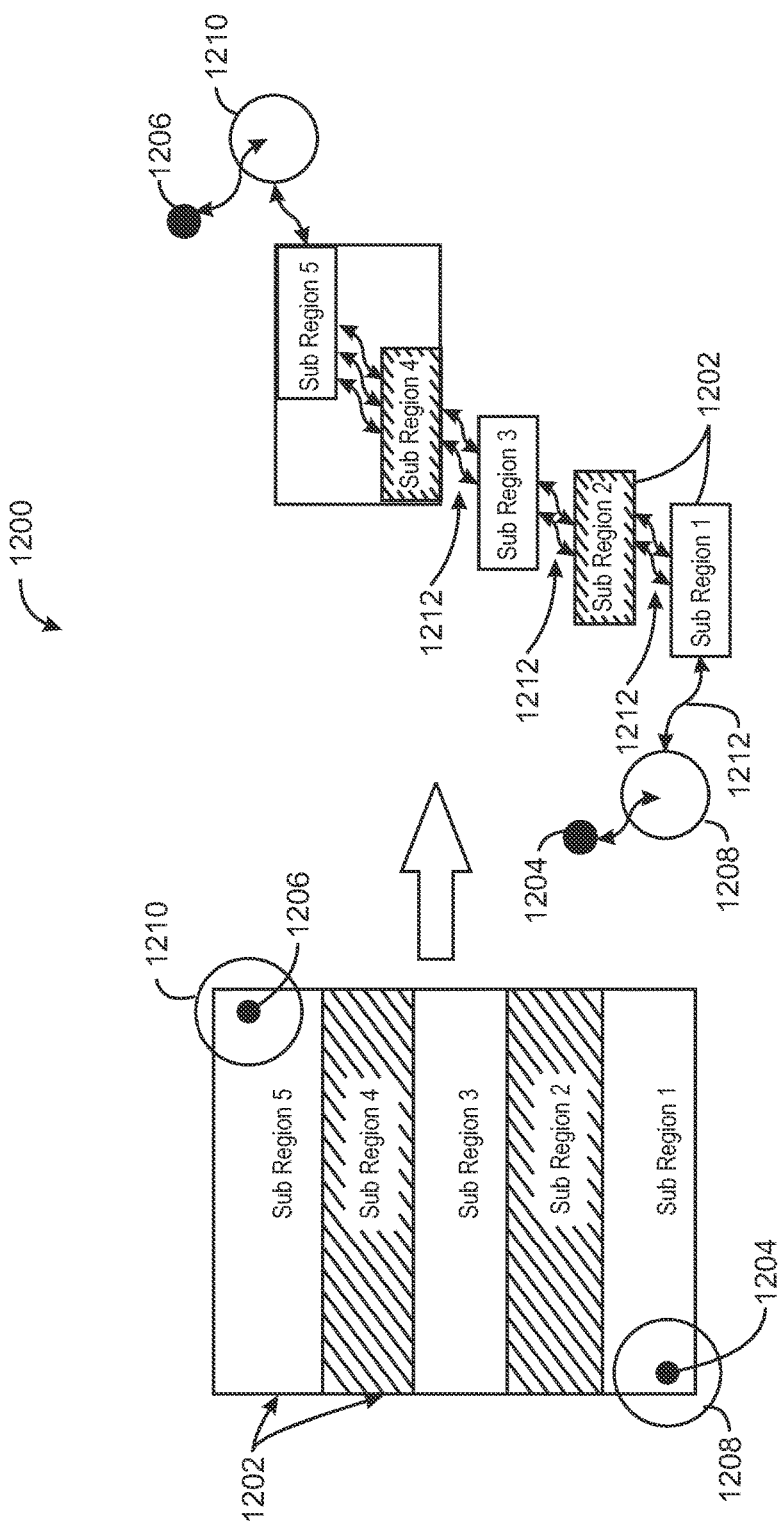
FIG. 12 is a schematic view of a coarse grid model of a reservoir, in accordance with an exemplary embodiment of the present techniques.

FIG. 12 is a schematic view of a coarse grid model 1200 of a reservoir, in accordance with an exemplary embodiment of the present techniques. In some exemplary embodiments, the techniques for computing a machine learning based solution surrogate for a reservoir sub region described above may be combined during reservoir simulation. The coarse grid model 1200 may include a plurality of sub regions 1202, each of which may be characterized according to different physical, geometrical, or numerical parameters, for example, different rock porosity, phase permeability, and the like. A first sub region 1202 may include an injector well 1204, and an nth sub region may include a producer well 1206. The injector well 1204 and producer well 1206 may be surrounded by near-well regions 1208 and 1210, both of which may be modeled separately. Each sub region 1202 may be approximated with a different solution surrogate computed using one of the techniques described above. For example, some sub regions 1202 may be approximated with an inverse operator, $A^{-1}$, as described in relation to FIGS. 5 and 6. Some sub regions 1202 may be approximated with a coarse scale relative permeability operator as described in relation to FIG. 7-9. Some sub regions 1202 may be approximated with a surrogate constitutive relationship between flux and pressure, as described in relation to FIGS. 10 and 11. Each of the sub regions 1202, the near well regions 1208 and 1210, the injector well 1204, and the producer well 1206 may be referred to as "elemental regions." Between each elemental region is an interface 1212. A solution of the reservoir model 1200 may be computed by computing the flow response for each elemental region individually, based on the solution surrogate available or suitable for each elemental region 1202. The flow response characteristics may be computed for each elemental region in order from the injector well 1204 to the producer well 1206. The boundary conditions for each elemental region may be determined based on the flux at the interface 1212 determined for the previously computed sub region 102.

Figure 13:
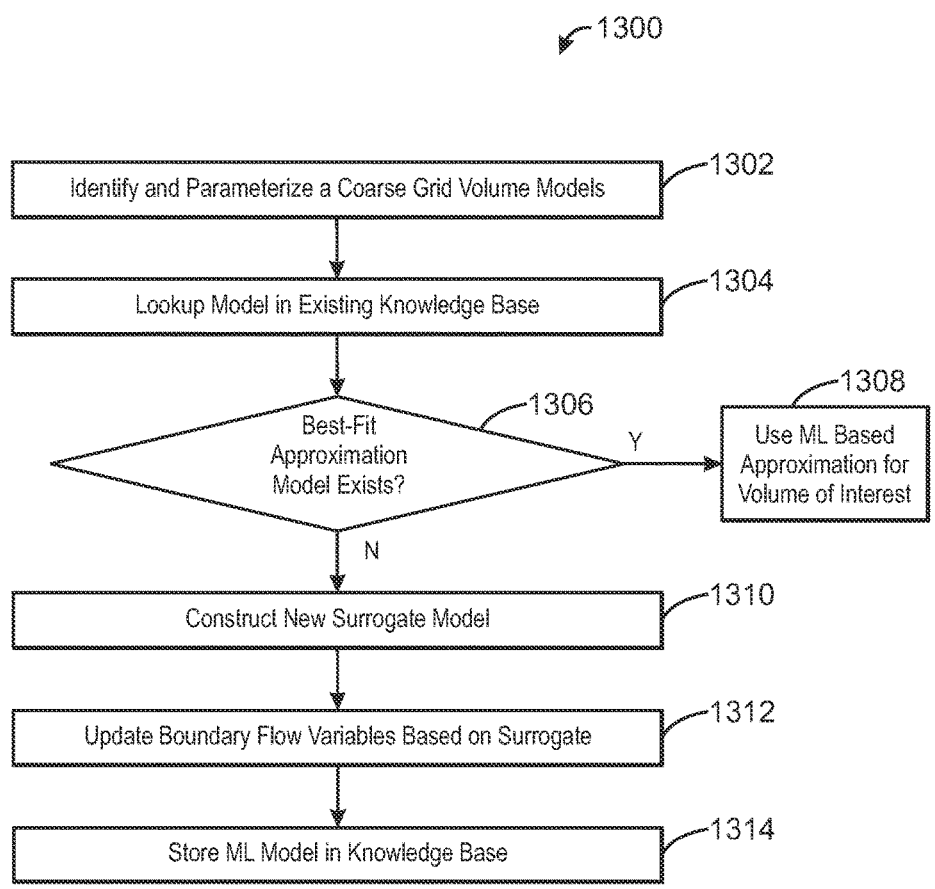
FIG. 13 is a process flow diagram of a method for modeling fluid flow in a reservoir, in accordance with an exemplary embodiment of the present techniques.

FIG. 13 is a process flow diagram of a method 1300 for modeling fluid flow in a reservoir, in accordance with an exemplary embodiment of the present techniques. The method 1300 may begin at block 1302, wherein the coarse grid model 1200 (FIG. 12) may be identified and parameterized. Identifying and parameterizing the coarse grid simulation model 1200 may include dividing the reservoir model into a plurality of sub regions 1202 based on based on parameters such as heterogeneity and coarse scale fluid properties, for example, phase permeability, phase saturation, and the like. The reservoir model 1202 may be divided into sub regions 1202 such that each sub region 1202 exhibits a relatively consistent rock texture that may be properly modeled via machine learning methods. The sub-regions 1202 may be more amendable to machine learning based modeling techniques if the heterogeneity of porosity and permeability of the sub-region 102 may be well described by just a few parameters and the flow response of the sub region 1202 to different boundary conditions may be properly captured by the surrogate model. Such sub region 1202 may be identified by any combination of computational, analytical and interpretive methods such as seismic pattern recognition and expert analysis.

At block 1304, a sub region 1202 may be selected and used to search database of existing solution surrogates. Identifying the matching solution surrogate for the sub region 1202 may include comparing the model parameters of the selected sub region 502 (FIG. 5) with the model parameters stored for each of the previously generated solution surrogates to identify an existing solution surrogate whose model parameters closely resemble the selected sub region 502.

At block 1306, a determination is made regarding whether a matching solution surrogate for the present sub region 1202 has been identified. If a matching solution surrogate has been identified, the process flow may advance to block 1308. At block 1308, the identified solution surrogate may be obtained from the database. The solution surrogate obtained from the database may be used during the reservoir simulation to compute the flow response at the interface 1212 between the current sub region 1202 and the next sub region 1202. During simulation, the applicable conservation laws, such as conservation of mass, momentum, angular momentum, energy, and the like, will be enforced across the flux interface 1212 between the sub regions 1202.

If a matching model has not been identified at block 1306, the process flow may advance to block 1310, wherein a solution surrogate may be computed for the sub region 1202, using a machine learning method such as the neural net 400 (FIG. 4). The training set used to train the training neural net 400 may be computed by running a training simulation, which may be a numerically and computationally accurate reservoir simulation with enough resolution to capture all desired physical processes including the fluid flow over the sub region 1202. The training set may then be used to compute the solution surrogate, as described above in relation to FIGS. 5-11. In some exemplary embodiments, a plurality of training sets may be generated by running a plurality of full-physics reservoir simulations using a variety of boundary conditions that are likely to be encountered in subsequent reservoir simulations in which the resulting solution surrogate will be used. In some embodiments, the training set may be computed by another surrogate model. The resulting training sets may be used to train the neural net multiple times, and a least squares algorithm may be applied to the multiple neural net solutions to compute the surrogate solution.

At block 1312 the solution surrogate may be used to compute the state variables such as fluid properties or fluid flow at the interfaces 1212 of the sub region 1202. For example, given an initial set of state variables at the interface 1212, the solution surrogate provides the change in the state variables at the interface 1212 at the end of a given time-step. The flow at the interface 1212 may be governed by any suitable model for pressure and flow change across a boundary, such as the inverse matrix operator, $A^{-1}$, Darcy's Law, or a machine learning based constitutive relationship.

At block 1314, the model parameters for the sub region 1302 and the resulting solution surrogate may be stored to the database for use in subsequent reservoir simulations. The process flow described above may be repeated for each sub region 1202. To reduce the parameter space used to develop the training sets for the machine learning algorithm, a reduced set of parameters to describe the simulation system may be identified by methods such as principle component analysis (PCA) or proper orthogonal decomposition (POD). The use of PCA or POD may reveal that full systems with distinct and unique looking parameter sets are indistinguishable in a reduced system and may therefore be excluded as extraneous.

Experimental Results—One Dimensional Diffusion

Figure 14:
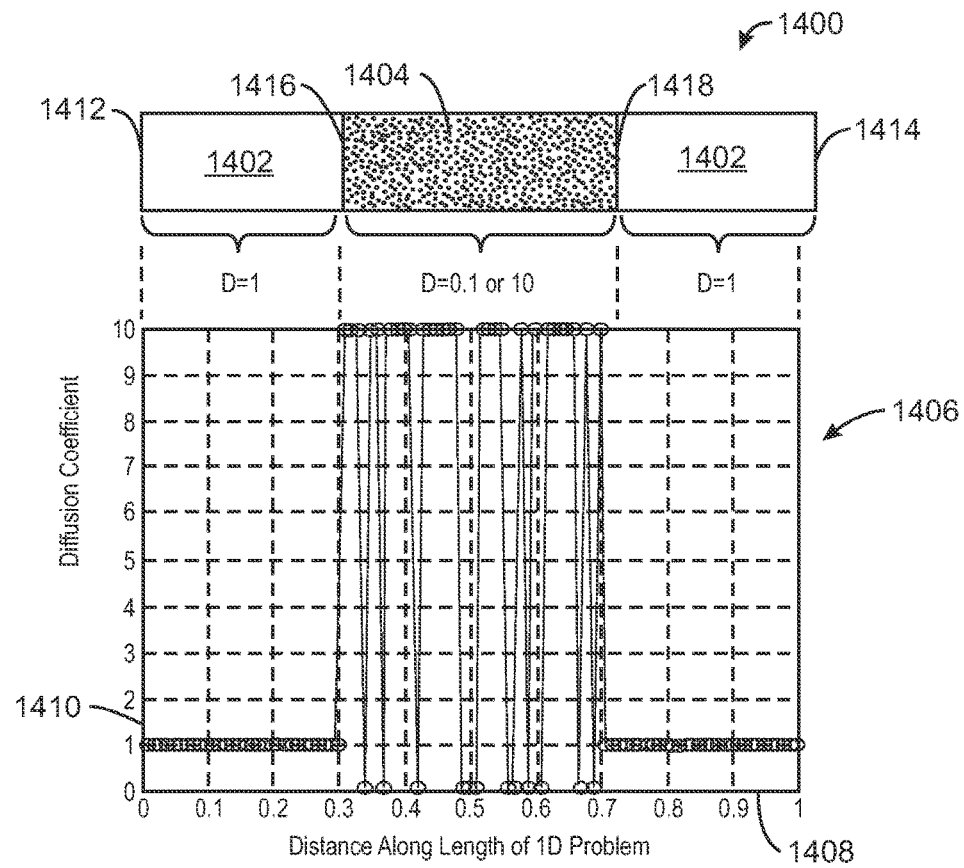
FIG. 14 is a schematic view of a one dimensional medium through which a porous flow may be simulated using machine learning.

FIG. 14 is a schematic view of a one dimensional medium 1400 through which a porous flow may be simulated using machine learning. The medium 1400 may include outer sub regions 1402 with a diffusion coefficient of one. The medium 1400 may also include a central sub region 1404 over which the diffusion coefficient varies between a very high diffusion coefficient, for example 10, and a very low diffusion coefficient, for example 0.1. The diffusion coefficient may be randomly specified at 100 discrete intervals along the central sub region 1404. The diffusion coefficient across the medium 1400 is shown in the corresponding graph 1406, wherein the x-axis 1408 represents the distance along the medium and the y-axis 1410 represents the diffusion coefficient.

Diffusion in the medium 1400 is caused by a non-stationary boundary condition at a left boundary 1412, where a concentration is specified as a sine function with amplitude of 1.0. The right bound 1414 remains closed (no-flow). The exact frequency of boundary condition oscillations was excluded from system parameters to force the model to describe any unknown variations without memorizing a frequency "hint." The goal of the present experiment was to relate the concentration at a left bound 1416 of the central sub region 1404 with the concentration at a right bound 1418 of the central sub region 1404 using a neural net.

Figure 15:
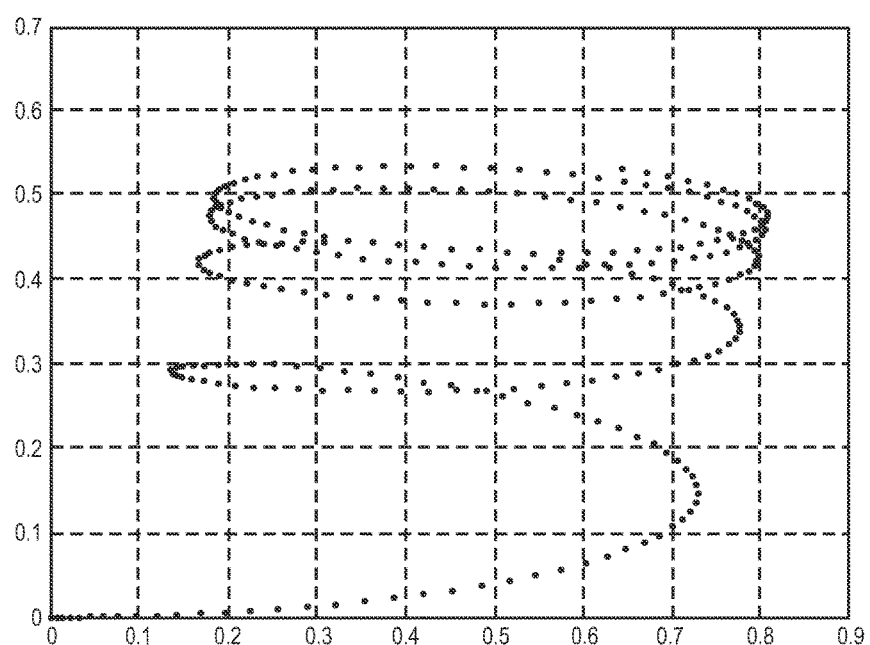
FIG. 15 is a response diagram of the medium shown in FIG. 14.

FIG. 15 is a response diagram of the medium shown in FIG. 14. The response diagram shows the point-to-point dependence between the concentration at the left bound 1416 of the central sub region 1404 with concentration at the right bound 1418 of the central sub region 1404 generated by a finite difference simulation. The data represented by the response diagram may be used as a training set for training a neural network. The inputs to the neural network are the concentrations at the left bound 1416 and the right bound 1418 of the central sub region 1404 at some number of previous time-steps. The system has one external parameter, which is the fraction of low diffusion coefficient cells compared to high diffusion coefficient cells. The system also includes embedded sequences of concentrations from the left bound 1416 and right bound 1418 of the central sub region 1404. The desired output of the neural network is the value of concentration at the right bound 1418 of the central sub region 1404 at the next time step. Modeled in this way, a random sub region can be extracted from the finite difference simulation scheme and replaced with a neural net that exchanges information with the rest of the system at each time step.

Figure 16:
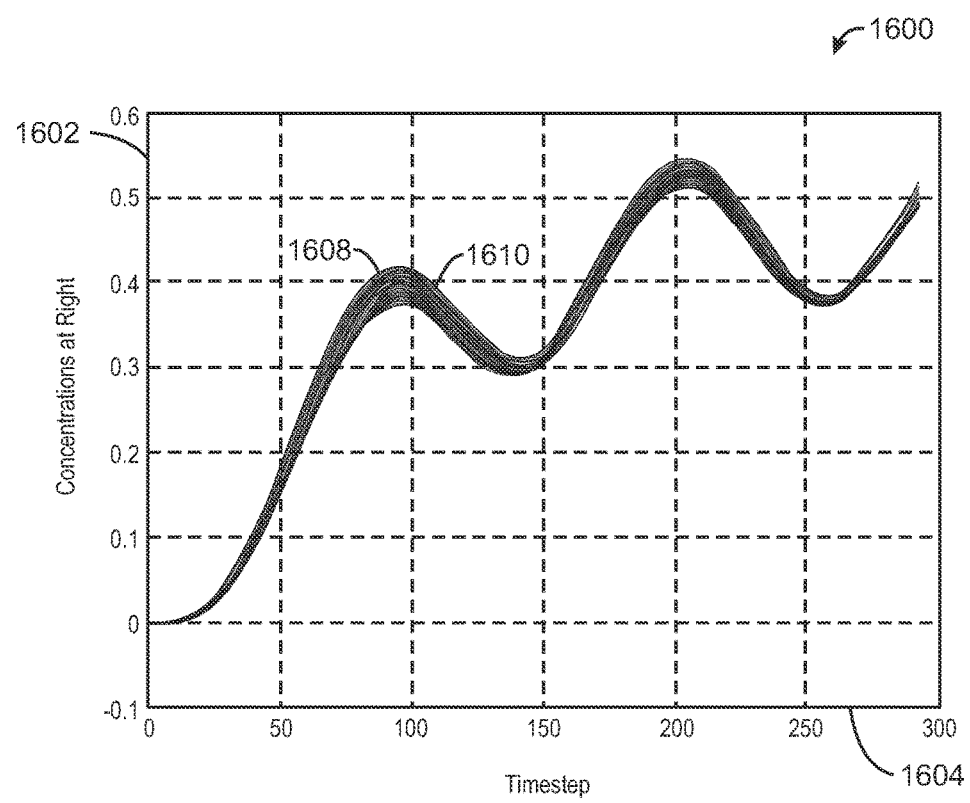
FIG. 16 is a graph of test data comparing a finite difference simulation of the sub region shown in FIG. 14 with a machine learning based solution surrogate simulation.

FIG. 16 is a graph 1600 of test data comparing a finite element simulation of the sub region shown in FIG. 14 with a machine learning based solution surrogate simulation as described in relation to FIGS. 14 and 15. The y-axis 1602 represents the concentrations at the right bound 1418 of the central sub region 1404. The x-axis 1604 represents the time step. The test data includes twenty trajectories representing concentrations at the right bound 1418 of the central sub region 1404 as a function of time step for twenty different central sub region 1404 compositions. The composition of the central sub region was varied for each trajectory by randomly varying the fraction of low diffusion coefficient cells to high diffusion coefficient cells. The neural net solution surrogate included three layers of nonlinear neurons, and three previous time steps were included as input to the neural net. Solid lines 1608 represent finite element simulated data. Dashed lines 1610 represent machine-learning based solution surrogate simulated data. As shown in FIG. 16, the neural net solution surrogate provided as average precision equal to the deviation between samples.

Experimental Results—Two Dimensional Transport

Figure 17:
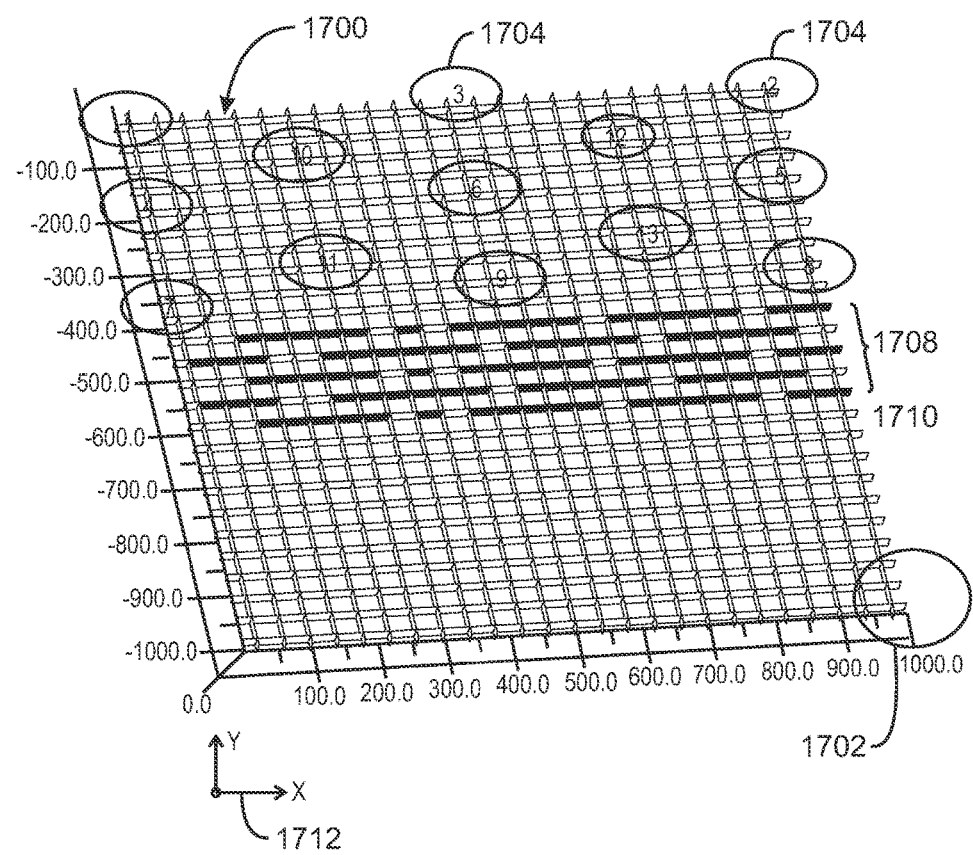
FIG. 17 is a fine mesh simulation model used to develop a training set for training a neural net solution surrogate to porous media flow.

FIG. 17 is a fine mesh simulation model 1700 used to develop a training set for training a neural net solution surrogate to porous media flow. The fine mesh simulation model 1700 includes a central sub region 1708, which represents a region of shale. The middle shale region contains non-transparent barriers 1710, creating a complicated fine grain flow. Steady state flow was established between a single injector well 1702 and each of a number of single producer wells 1704 positioned at varying locations labeled "1" to "13." A tracer (not shown) was introduced at the injector well with sinusoidal time dependence. The main liquid flow from the injector well 1702 to any one of the producer wells 1704 is stationary. The injector well 1702 starts to pump the tracer substance, which follows pressure gradients and flow. The distribution of the tracer concentration is observed as a function of time and the X and Y spatial coordinates.

The goal of the present experiment was to approximate the flow response of the central sub region 1708 by means of a machine-learning model. Forty reservoir simulations were carried out, with different parameters settings such as the shale length fraction, the shale spacing fractions in X and Y directions, shale region extent, and coordinates of each of the producer wells 1704. Additionally, the location of the producer well 1704 was changed to yield a different flow pattern and hence a different set of flow boundary conditions along the two sides of the central sub region 1708.

The first trial task of each simulation was to approximate the complete fluid flow in the fine mesh simulation model 1700 as indicated by the tracer concentration as a function of time and the X and Y coordinates. The goal is to create a neural net model with fewer neuron weight parameters compared to the total number of values in the tabular numerical solution of the simulation. It was found that results from a neural net model with 500 weight parameters corresponding to a compression ratio of 1:1000 provided enough accuracy to be visually similar to the results from the full simulation. A neural net with 500 nodes provided significant compression of the surrogate model compared to the full simulation model. Next, the boundary of the central sub region 1708 was split into four segments 1802, as shown in FIG. 18.

In a slightly different setting all data from the first half of a simulation (plus a complete injector history) were used for training, with the aim of projecting the solution to the second half. This simulation demonstrated accuracy during 10%-20% at the beginning of second half time, and then degraded. It is worth noting that the training time was a couple of hours on a standard PC. This is of the same order as the cost of running the simulations.

Figure 18:
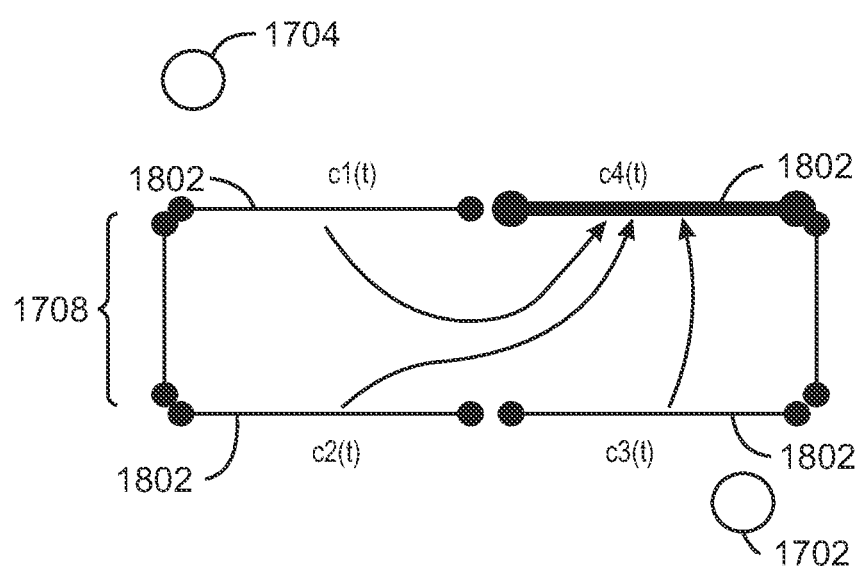
FIG. 18 is model of the central sub region shown in the fine mesh simulation model FIG. 17.

FIG. 18 is model of the central sub region shown in the fine mesh simulation model of FIG. 17. As shown in FIG. 18, the boundary of the central sub region 1708 was split into four segments 1802. Each boundary segment 1802 corresponds with a spatially averaged concentration over the length of the boundary segment 1802. The goal was to predict the concentration at one of the boundary segments 1802 as a function of the delayed concentration sequences at all four boundary segments 1802 under varied system state parameters, such as shale length fraction, the shale spacing fractions in X and Y directions, shale region extent, and coordinates of the producer well 1704. The concentration at the boundary segment 1802 labeled "C4" can be represented by the formula shown in Eqn. 12:

$$C4(t)=F(C1(t-1), \ldots C1(t-n), C2(t-1) \ldots C2(t-n), C3(t-1), \ldots C3(t-n), X, Y, \text{Parameters}). \quad \text{Eqn. 12}$$

As shown in the above formula, the concentration at boundary segment C4 at time step, t, is a function of the concentration at boundary segments C1, C2, and C3 at previous time steps, t−1 to t−n, the X and Y coordinates of the producer well 1704, and the system state parameters.

A neural network was trained using training sets computed by all but one of the previous simulations. The latter simulation was used as a control simulation to evaluate the performance of the trained neural network. After training the neural net, the solution surrogate provided by the neural net was used to predict the concentration at the C4 boundary segment and compared to the control simulation.

Figure 19:
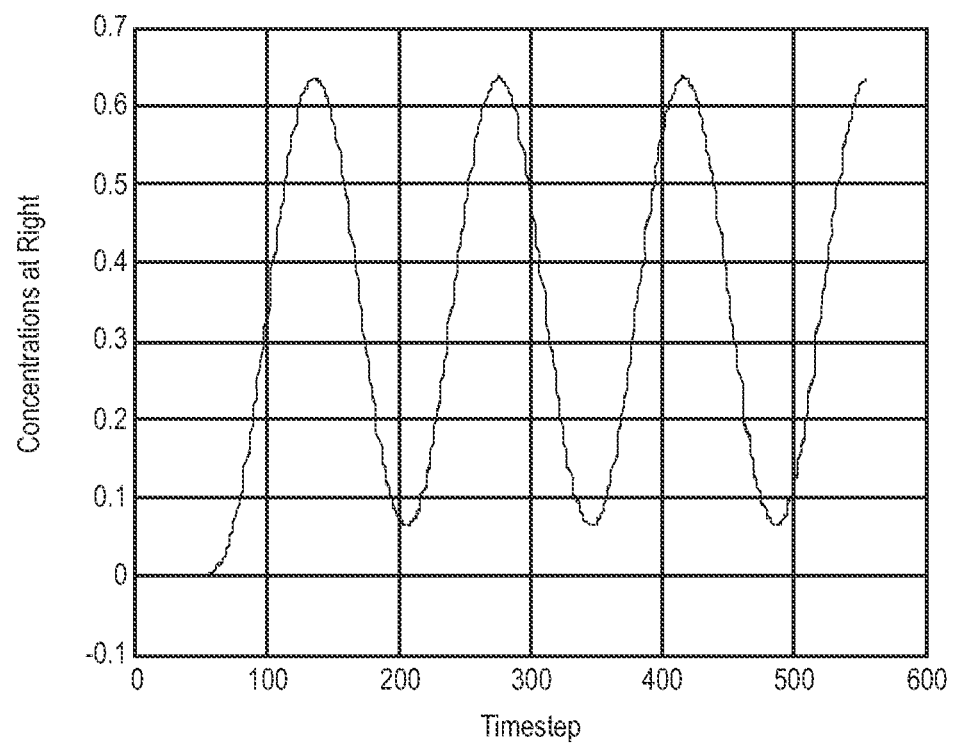
FIG. 19 is a graph of the concentration at boundary segment C4 of FIG. 18 at varying time steps.

FIG. 19 is a graph of the concentration at boundary segment C4 if FIG. 18 at varying time steps. Specifically, the graph shows the actual concentration as computed by the control simulation overlaid on top of the concentration as computed by the solution surrogate provided by the trained neural net. The graph 19 shows close correlation between the full-physics simulation and the machine-learning based solution surrogate.

Exemplary Cluster Computing System

Figure 20:
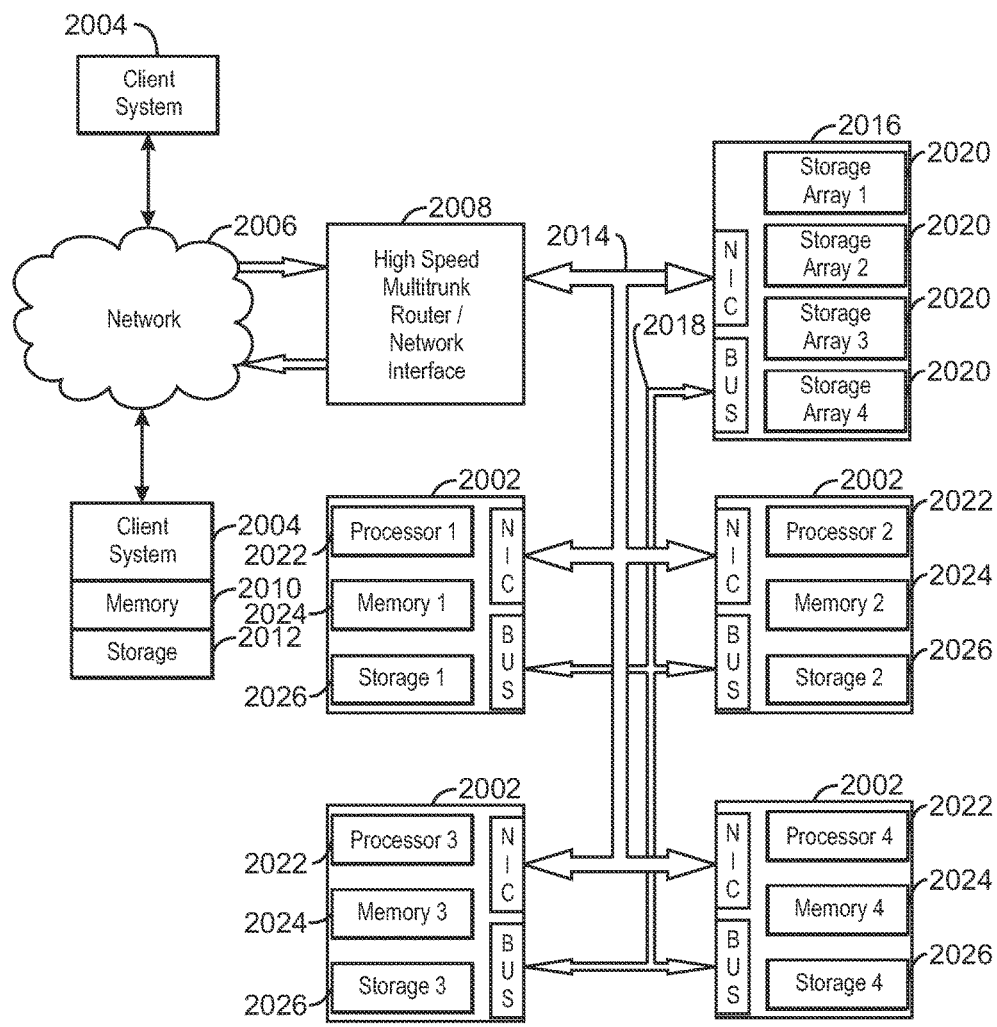
FIG. 20 is a block diagram of an exemplary cluster computing system that may be used in exemplary embodiments of the present techniques.

FIG. 20 is a block diagram of an exemplary cluster computing system 2000 that may be used in exemplary embodiments of the present techniques. The cluster computing system 2000 illustrated has four computing units 2002, each of which may perform calculations for part of the simulation model. However, one of ordinary skill in the art will recognize that the present techniques are not limited to this configuration, as any number of computing configurations may be selected. For example, a small simulation model may be run on a single computing unit 2002, such as a workstation, while a large simulation model may be run on a cluster computing system 2000 having 10, 100, 1000, or even more computing units 2002. In an exemplary embodiment, each of the computing units 2002 will run the simulation for a single subdomain or group of computational cells. However, allocation of the computing units 2002 may be performed in any number of ways. For example, multiple sub regions may be allocated to a single computing unit 2002 or multiple computing units 2002 may be assigned to a single sub region, depending on the computational load on each computing unit 2002.

The cluster computing system 2000 may be accessed from one or more client systems 2004 over a network 2006, for example, through a high speed network interface 2008. The network 2006 may include a local area network (LAN), a wide area network (WAN), the Internet, or any combinations thereof. Each of the client systems 2004 may have non-transitory, computer readable memory 2010 for the storage of operating code and programs, including random access memory (RAM) and read only memory (ROM). The operating code and programs may include the code used to implement all or any portions of the methods discussed herein. Further, the non-transitory computer readable media may hold a data representation of a physical hydrocarbon reservoir, for example, a reservoir model as shown in FIGS. 5, 10, and 12. The client systems 2004 can also have other non-transitory, computer readable media, such as storage systems 2012. The storage systems 2012 may include one or more hard drives, one or more optical drives, one or more flash drives, any combinations of these units, or any other suitable storage device. The storage systems 2012 may be used for the storage of code, models, data, and other information used for implementing the methods described herein. For example, the data storage system may hold a plurality of solution surrogates that have been computed for previously encountered sub regions and may be re-used in subsequent reservoir simulations.

The high speed network interface 2008 may be coupled to one or more communications busses in the cluster computing system 2000, such as a communications bus 2014. The communication bus 2014 may be used to communicate instructions and data from the high speed network interface 2008 to a cluster storage system 2016 and to each of the computing units 2002 in the cluster computing system 2000. The communications bus 2014 may also be used for communications among computing units 2002 and the storage array 2016. In addition to the communications bus 2014 a high speed bus 2018 can be present to increase the communications rate between the computing units 2002 and/or the cluster storage system 2016.

The cluster storage system 2016 can have one or more tangible, computer readable media devices, such as storage arrays 2020 for the storage of data, visual representations, results, code, or other information, for example, concerning the implementation of and results from the methods of FIG. 23. The storage arrays 2020 may include any combinations of hard drives, optical drives, flash drives, holographic storage arrays, or any other suitable devices.

Each of the computing units 2002 can have a processor 2022 and associated local tangible, computer readable media, such as memory 2024 and storage 2026. The processor 2022 may include a single processing core, multiple processing cores, a GPU, or any combinations thereof. The memory 2024 may include ROM and/or RAM used to store code, for example, used to direct the processor 2022 to implement the method illustrated in FIG. 23. The storage 2026 may include one or more hard drives, one or more optical drives, one or more flash drives, or any combinations thereof. The storage 2026 may be used to provide storage for intermediate results, data, images, or code associated with operations, including code used to implement the methods of FIGS. 3, 6, 9, 11, and 13.

The present techniques are not limited to the architecture or unit configuration illustrated in FIG. 20. For example, any suitable processor-based device may be utilized for implementing all or a portion of embodiments of the present techniques, including without limitation personal computers, networks personal computers, laptop computers, computer workstations, GPUs, mobile devices, and multi-processor servers or workstations with (or without) shared memory. Moreover, embodiments may be implemented on application specific integrated circuits (ASICs) or very large scale integrated (VLSI) circuits. In fact, persons of ordinary skill in the art may utilize any number of suitable structures capable of executing logical operations according to the embodiments.

While the present techniques may be susceptible to various modifications and alternative forms, the exemplary embodiments discussed above have been shown only by way of example. However, it should again be understood that the present techniques are not intended to be limited to the particular embodiments disclosed herein. Indeed, the present techniques include all alternatives, modifications, and equivalents falling within the true spirit and scope of the appended claims.

What is claimed is:

1. A method for modeling a hydrocarbon reservoir, comprising:
    generating a reservoir model comprising a plurality of sub regions, wherein the reservoir model is segmented into the plurality of sub regions that represent different portions of the reservoir model and the reservoir model is utilized to model fluid flow within the hydrocarbon reservoir;
    obtaining a solution surrogate for at least one sub region of the plurality of sub regions by:
        searching a database of existing solution surrogates to determine if an approximate solution surrogate exists based on a comparison of physical, geometrical, or numerical parameters of the at least one sub region with physical, geometrical, or numerical parameters associated with the existing solution surrogates in the database;
        if the approximate solution surrogate exists, then associating one of the existing solution surrogates with the at least one sub region as the solution surrogate;
        if the approximate solution surrogate does not exist in the database:
            simulating the sub region using a training simulation of the sub region to obtain a set of training parameters comprising state variables and boundary conditions of the sub region, wherein the training simulation is a reservoir simulation having resolution to represent predetermined physical processes wherein the simulating the sub region comprises generating a set of inputs, a set of desired outputs, and weighting values, w;
            using a machine learning algorithm to obtain a new solution surrogate based on the set of training parameters wherein the machine learning algorithm calculates a set of computed outputs, compares the set of computed outputs to the set of desired outputs to calculate a value for an objective function between the set of computed outputs and the set of desired outputs, and uses the value of the objective function to alter the weighting values, w, in at least one subsequent iteration of calculating a value for the new solution surrogate;
            storing the new solution surrogate to the database; and
            associating the new solution surrogate with the at least one sub region as the solution surrogate; and
    simulating fluid flow in the hydrocarbon reservoir using the reservoir model comprising the plurality of sub regions and the solution surrogate obtained for the at least one sub region;
    generating a data representation of a physical hydrocarbon reservoir in a non-transitory, computer-readable, medium based at least in part on the results of the simulation; and
    causing hydrocarbon to be produced from the hydrocarbon reservoir based, at least in part, upon the results of the simulation.

2. The method of claim 1, wherein using the machine learning algorithm to obtain the new solution surrogate comprises approximating an inverse operator of a matrix equation that provides a solution to the fluid flow through a porous media.

3. The method of claim 1, wherein the machine learning algorithm is used to obtain a plurality of effective phase permeability values for a coarse grid, wherein the plurality of effective phase permeability values is used to calculate fluid flow through a porous media.

4. The method of claim 1, wherein using the machine learning algorithm to obtain the new solution surrogate comprises training a neural net using the training parameters, wherein the boundary conditions are used as input to the neural net and the state variables are used as a desired output.

5. The method of claim 1, wherein simulating the sub region using the training simulation of the sub region comprises specifying a set of boundary condition types for each boundary of the sub region and generating a fine-gridded computational mesh of the sub region.

6. The method of claim 1, wherein storing the new solution surrogate to the database comprises associating the solution surrogate with a set of physical, geometrical, or numerical parameters used to generate the solution surrogate and storing the parameters to the database.

7. The method of claim 6, wherein the new solution surrogate is re-used in subsequent hydrocarbon reservoir simulations based on a comparison of the set of physical, geometrical, or numerical parameters stored to the database with the solution surrogate and a new set of physical, geometrical, or numerical parameters that characterize a new sub region.

8. The method of claim 7, wherein the physical parameters comprise distribution of permeability, porosity, grid geometry of the training simulation of the sub region, or some combination thereof.

9. A method for producing a hydrocarbon from a hydrocarbon reservoir, comprising:

generating a reservoir model comprising a plurality of sub regions, wherein the reservoir model is segmented into the plurality of sub regions that represent different portions of the reservoir model and the reservoir model is utilized to model fluid flow within the hydrocarbon reservoir;

obtaining a solution surrogate for at least one sub region of the plurality of sub regions by:

searching a database of existing solution surrogates to determine if an approximate solution surrogate exists based on a comparison of physical, geometrical, or numerical parameters of the at least one sub region with physical, geometrical, or numerical parameters associated with the existing solution surrogates in the database;

if the approximate solution surrogate exists, then associating one of the existing solution surrogates with the at least one sub region as the solution surrogate; and if the approximate solution surrogate does not exist in the database, simulating the sub region using a training simulation of the sub region to obtain a set of training parameters comprising state variables and boundary conditions of the sub region, wherein the simulating the sub region comprises generating a set of inputs, a set of desired outputs, and weighting values, w, using a machine learning algorithm to obtain a new solution surrogate based on the set of training parameters, wherein the machine learning algorithm calculates a set of computed outputs, compares the set of computed outputs to the set of desired outputs to calculate a value for an objective function between the set of computed outputs and the set of desired outputs, and uses the value of the objective function to alter the weighting values, w, in at least one subsequent iteration of calculating a value for the new solution surrogate, storing the new solution surrogate to the database, and associating the new solution surrogate with the at least one sub region as the solution surrogate, wherein the training simulation is a reservoir simulation having resolution to represent predetermined physical processes;

simulating fluid flow in the hydrocarbon reservoir using the reservoir model comprising the plurality of sub regions and the solution surrogate obtained for the at least one sub region; and producing a hydrocarbon from the hydrocarbon reservoir based, at least in part, upon the results of the simulation.

10. The method of claim 9, wherein producing the hydrocarbon comprises:

drilling one or more wells to the hydrocarbon reservoir, wherein the wells comprise production wells, injection wells, or both;

setting production rates from the hydrocarbon reservoir; or any combinations thereof.

* * * * *